US012103151B2

(12) United States Patent
Aizawa et al.

(10) Patent No.: US 12,103,151 B2
(45) Date of Patent: Oct. 1, 2024

(54) DRIVING DEVICE

(71) Applicant: Koki Holdings Co., Ltd., Tokyo (JP)

(72) Inventors: Sotaro Aizawa, Ibaraki (JP); Kazuhiro Ootsuka, Ibaraki (JP); Yoshiichi Komazaki, Ibaraki (JP)

(73) Assignee: KOKI HOLDINGS CO., LTD., Tokyo (JP)

( * ) Notice: Subject to any disclaimer, the term of this patent is extended or adjusted under 35 U.S.C. 154(b) by 80 days.

(21) Appl. No.: 17/780,348

(22) PCT Filed: Oct. 30, 2020

(86) PCT No.: PCT/JP2020/040885

§ 371 (c)(1),
(2) Date: May 26, 2022

(87) PCT Pub. No.: WO2021/106496

PCT Pub. Date: Jun. 3, 2021

(65) Prior Publication Data

US 2023/0025226 A1 Jan. 26, 2023

(30) Foreign Application Priority Data

Nov. 28, 2019 (JP) ................................ 2019-215327
Dec. 13, 2019 (JP) ................................ 2019-225006

(51) Int. Cl.
*B25C 1/06* (2006.01)
*B25C 1/04* (2006.01)

(52) U.S. Cl.
CPC . *B25C 1/06* (2013.01); *B25C 1/04* (2013.01)

(58) Field of Classification Search
CPC ........... B25C 1/047; B25C 1/04; B25C 1/001; B25C 1/06
See application file for complete search history.

(56) References Cited

U.S. PATENT DOCUMENTS 6,006,975 A 12/1999 Ishizawa
2020/0189080 A1 6/2020 Aizawa et al.

FOREIGN PATENT DOCUMENTS

JP S61-151877 U 9/1986
JP H11-179678 A 7/1999
(Continued)

OTHER PUBLICATIONS

International Search Report issued in corresponding International Application No. PCT/JP2020/040885, dated Dec. 15, 2020 w/English Translation (5 pages).

*Primary Examiner* — Thomas M Wittenschlaeger
(74) *Attorney, Agent, or Firm* — Rimon P.C.

(57) ABSTRACT

Realized is a driving device capable of controlling driving timing of a blade and driving timing of a feeder independently. The driving device of the present invention has a housing having an injection path, a blade hitting a nail supplied to the injection path, an electric motor, a controller controlling drive of the electric motor, a magazine accommodating connected nails, and a supply, mechanism sequentially supplying the connected nails, which are accommodated in the magazine, to the injection path. The supply mechanism has a reciprocable feeder backward and forward, an energizing member energizing the feeder forward, and a stopper holding a position of the backward moved feeder against energization of the energizing member. Then, holding the position of the feeder by the stopper is released based on control of the controller.

23 Claims, 27 Drawing Sheets

1A: DRIVING DEVICE
10: HOUSING
14: INJECTION PATH
17: ELECTRIC MOTOR
19: CONTROLLER
20: MAGAZINE
21a: FASTENER
50: SUPPLY MECHANISM
60: FEEDER
80: ENERGIZING MEMBER
81: STOPPER

(56) References Cited

FOREIGN PATENT DOCUMENTS

| | | | | |
|---|---|---|---|---|
| JP | 2006-130592 A | | 5/2006 | |
| WO | WO-2018198672 A1 | * | 11/2018 | ............. B25C 1/047 |

* cited by examiner

1A: DRIVING DEVICE
10: HOUSING
14: INJECTION PATH
17: ELECTRIC MOTOR
19: CONTROLLER
20: MAGAZINE
21a: FASTENER
50: SUPPLY MECHANISM
60: FEEDER
80: ENERGIZING MEMBER
81: STOPPER

127: ACCUMULATOR CHAMBER
129: DRIVER BLADE
154: FASTENER
163: FEEDER
D3: FEED DIRECTION

DRIVING DEVICE

CROSS REFERENCE TO RELATED APPLICATIONS

This application is the U.S. National Phase under 35 U.S.C. § 371 of International Application No. PCT/JP2020/040885, filed on Oct. 30, 2020, which claims the benefit of Japanese Application No. 2019-215327, filed on Nov. 28, 2019, and Japanese Application No. 2019-225006, filed on Dec. 13, 2019, the entire contents of each are hereby incorporated by reference.

TECHNICAL FIELD

The present invention relates to a driving device, and more particularly to a driving device provided with a supply mechanism for supplying a fastener such as a nail or a screw to an injection path.

BACKGROUND ART

A driving device (sometimes called a "fastener driving device") for driving fasteners into wood, gypsum board, or the like is known. The driving device includes: a magazine that accommodates connected nails composed of a plurality of nails coupled to each other; a supply mechanism that sequentially supplies the connected nails accommodated in the magazine to an injection path; and a blade (sometimes called a "driver blade") that hits the nail supplied to the injection path to drive it into wood, gypsum board, or the like.

Here, the driving device is roughly divided into: a cord type driving device that drives the blade by compressed air supplied from an air compressor connected via a pressure-resistant hose or the like; and a cordless type driving device that drives the blade by a built-in drive source such as an electric motor or a spring (including an air spring).

Patent Document 1 discloses an example of a conventional cordless driving device provided with the supply mechanism. The driving device disclosed in Patent Document 1 includes an electric motor, a pin wheel, a driver blade, and a feeder.

The pin wheel is provided with a plurality of pinion pins, and the driver blade is provided with a plurality of convex portions. Further, the pin wheel is provided with a plurality of pins separately from the pinion pins.

When the pin wheel is rotated and driven by the electric motor, the plurality of pinion pins and convex portions are sequentially engaged with each other and the driver blade rises. At the same time, a rotational force of the pin wheel is transmitted to a rotating shaft, and the rotating shaft rotates. The rotating shaft includes a flange and a cam provided with a plurality of pins that are engaged with the plurality of pins provided on the pin wheel, and the rotational force of the pin wheel is transmitted to the rotating shaft by the engagement between the pin provided on the pin wheel and the pin provided on the flange.

When the rotating shaft rotates, the cam is engaged with the feeder and moves the feeder in a direction away from the injection path against energization of the spring. When the rotating shaft rotates further, the engagement between the cam and the feeder is disengaged and the feeder moves in a direction approaching the injection path by the energization of the spring. The feeder feeds the nail, which is located at the head of the connected nails, into the injection path while it moves toward the injection path by the energization of the spring.

RELATED ART DOCUMENTS

Patent Documents

Patent Document 1: International Publication WO 2018/198672

SUMMARY OF THE INVENTION

Problems to be Solved by the Invention

In the driving device disclosed in Patent Document 1, the pin provided with the pin wheel and the pin provided with the rotating shaft are always engaged with each other. Consequently, when the pinwheel rotates, the rotating shaft (cam) also rotates inevitably. Then, each time the cam makes one rotation, the feeder executes a nail feeding operation. That is, drive timing of the feeder depends on drive timing of the pin wheel. However, the pin wheel is responsible not only for driving the feeder but also for driving the driver blade. Therefore, the drive timing of the pin wheel cannot be optimized only from the viewpoint of the drive timing of the feeder, and cannot be optimized only from the viewpoint of the drive timing of the driver blade, either. In other words, if the drive timing of the pin wheel is optimized by giving priority to the drive timing of the feeder, the driver blade may not be driven at the optimum timing. Further, if the drive timing of the pin wheel is optimized by giving priority to the drive timing of the driver blade, the feeder may not be driven at the optimum timing.

An object of the present invention is to realize a driving device capable of independently controlling the drive timing of the blade and the drive timing of the feeder.

Means for Solving the Problems

A driving device of the present invention includes: a housing having a nose portion that forms an injection path; a blade hitting a nail that is supplied to the injection path; an electric motor powered by a battery mounted in the housing; a control circuit controlling drive of the electric motor; a magazine accommodating connected nails wound in a roll shape; and a supply mechanism sequentially supplying the connected nails, which are accommodated in the magazine, to the injection path. The supply mechanism includes: a feeder capable of reciprocating in a first direction approaching the injection path and a second direction away from the injection path; an energizing mechanism for energizing the feeder in the first direction; and a stopper holding a position of the feeder, which has been moved in the second direction, against energization of the energizing mechanism. Further, the holding of the position of the feeder by the stopper is released based on control of the control circuit.

Effects of the Invention

According to the present invention, the driving device capable of independently controlling the drive timing of the blade and the drive timing of the feeder is realized.

Figure 1:
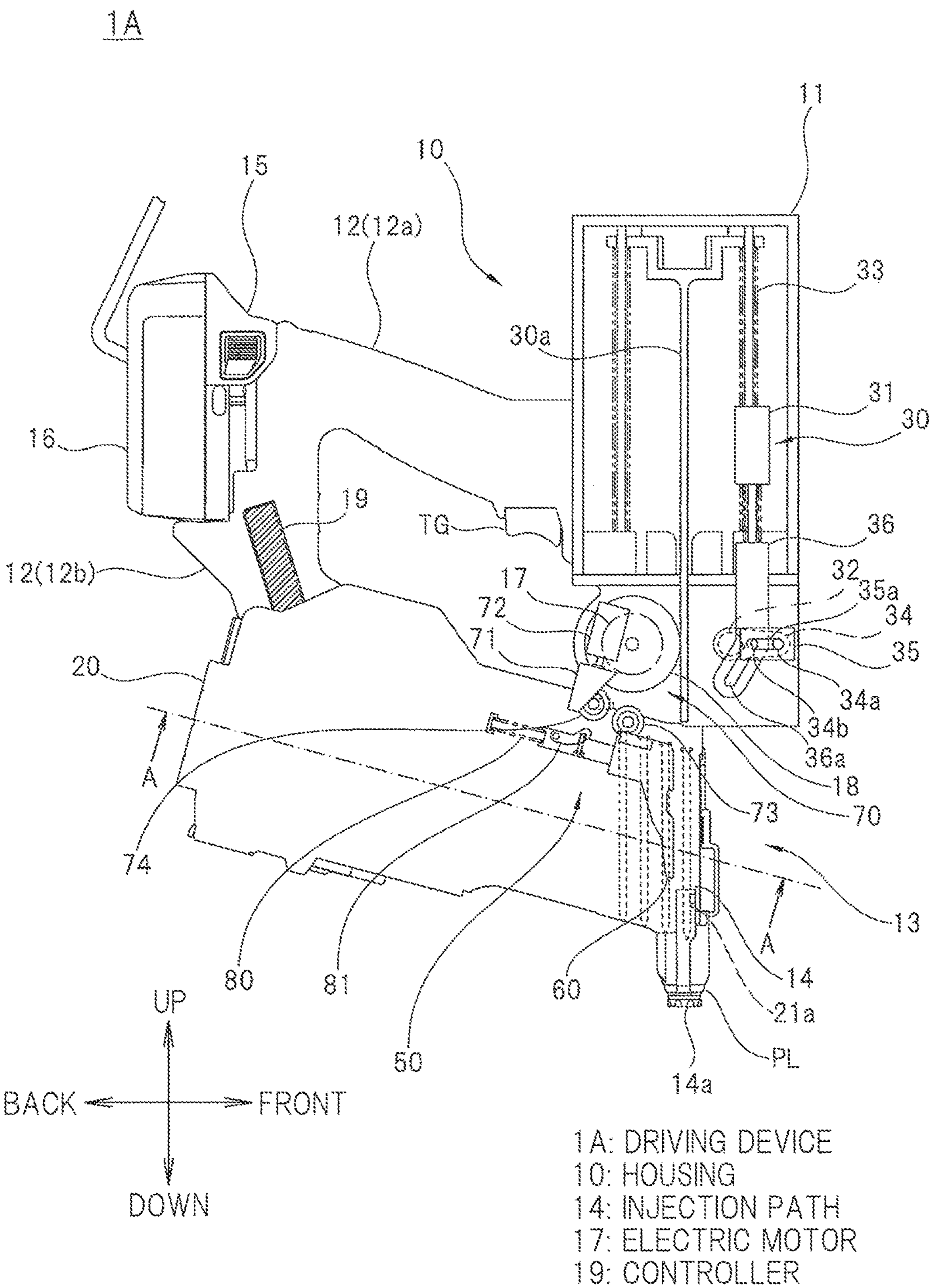
FIG. 1 is a schematic view showing a whole configuration of a driving device according to a first embodiment.

DETAILED DESCRIPTION OF PREFERRED EMBODIMENTS (First Embodiment) Hereinafter, an example of a driving device, to which the present invention is applied, will be described in detail with reference to the drawings. A driving device 1A shown in FIG. 1 has a housing 10, various mechanisms accommodated in the housing 10, and a magazine 20. The housing 10 includes a generally cylindrical case 11, and a handle 12 extending from a side surface of the case 11 toward a left side of a paper surface of FIG. 1. In the following description, a right-left (horizontal) direction of the paper surface in FIG. 1 is defined as a "front-back direction", an up-down (vertical) direction of the paper surface in FIG. 1 is defined as a "up-down direction", and a direction orthogonal to the front-back direction and the up-down direction is defined as a "right-left direction". If the handle 12 is explained in more detail based on the above-mentioned definition, the handle 12 includes a grip portion 12*a* extending diagonally upward in a back direction from the side surface of the case 11, and a connecting portion 12*b* extending downward from a back end of the grip portion 12*a*.

Figure 2:
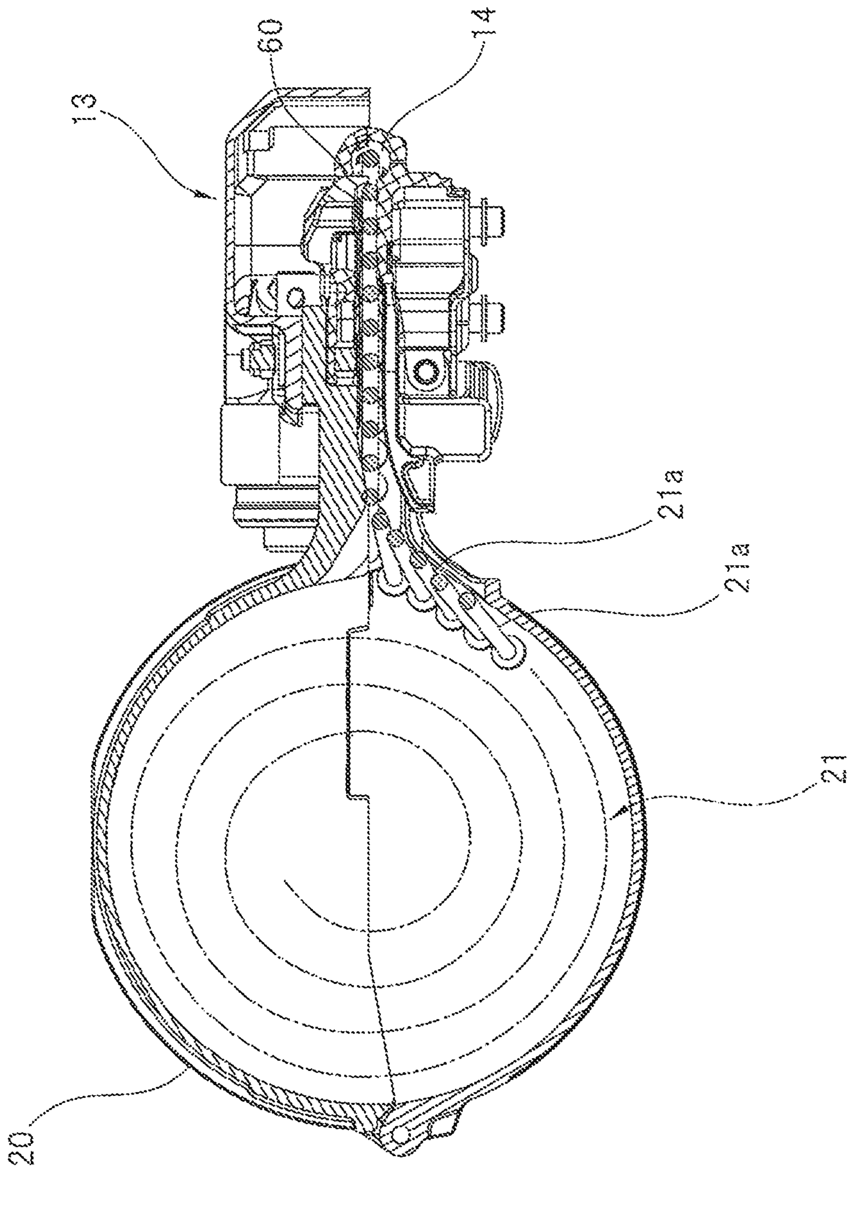
FIG. 2 is sectional view taken along line A-A shown in FIG. 1.

As shown in FIGS. 1 and 2, the magazine 20 has a substantially cylindrical shape as a whole. A back portion of the magazine 20 is connected to the handle 12 (connecting portion 12*b*), and a front portion of the magazine 20 is connected to a nose portion 113. The magazine 20 accommodates connected fasteners (connected nails 21) wound in a roll shape. The connected nails 21 are an aggregate of fasteners (nails 21*a*) in which a plurality of fasteners (nails 21*a*) are coupled to each other by a coupling member such as a wire or a plastic sheet and are integrated.

As shown in FIG. 1, each of the nails 21*a* included in the connected nails 21 are sequentially supplied to an injection path 14 by the supply mechanism 50, the injection path being formed by the nose portion 113. When the nail 21*a* (the nail 21*a* located at its head in a supply direction) in the injection path 14 is struck from an injection port 14*a*, the supply mechanism 50 sends out the next nail 21*a* (second nail 21*a*) in a first direction (a front direction) and supplies it to the injection path 14. Thereafter, when the second nail 21*a* is struck from the injection port 14*a*, the further next nail 21*a* (third nail 21*a*) is sent out in the front direction and is supplied to the injection path 14. In this way, the supply mechanism 50 sequentially supplies the nails 21*a* to the injection path 14. Details of the supply mechanism 50 will be described later.

As shown in FIG. 1, a power supply mounting portion 15 is provided at the back portion of the handle 12. The power supply mounting portion 15 is formed so as to straddle the grip portion 12*a* and the connecting portion 12*b* of the handle 12, and a battery 16 (for example, a lithium-ion battery) as a battery is mounted on the power supply mounting portion 15.

The case 11 accommodates a blade 30*a* that hits the nail 21*a* supplied to the injection path 14 by the supply mechanism 50, and a blade drive mechanism 30 that drives the blade 30*a*. The blade drive mechanism 30 reciprocates the blade 30*a* up and down by utilizing a rotational force of a rotating body 18 that is rotated and driven by the electric motor 17 using the battery 16 as a power source. That is, the electric motor 17 is a drive source that outputs a driving force for operating the blade 30*a*. However, the driving force outputted from the electric motor 17 is used not only for operating the blade 30*a* but also for operating the supply mechanism 50. In short, the electric motor 17 is a common drive source for the blade drive mechanism 30 and the supply mechanism 50.

The blade drive mechanism 30 includes a first actuator 31, a pressing roller 32, and a spring 33. The first actuator 31 is a solenoid actuator that operates based on control of a control circuit 19 provided inside the handle 12. The pressing roller 32 interposes the blade 30*a* and faces the rotating body 18. The spring 33 is a coil spring and is arranged around the blade 30*a*. In the following description, the first actuator 31 is referred to as a "first solenoid 31", the control circuit 19 is referred to as a "controller 19", the rotating body 18 is referred to as a "flywheel 18", and the spring 33 is referred to as a "first spring 33".

The pressing roller 32 is rotatably supported by a movable plate 34. The movable plate 34 that rotatably supports the pressing roller 32 is coupled to a support plate 35 protruding from an inner surface of the case 11, and is also coupled to a connecting plate 36 provided at a tip of a movable iron core (rod) of the first solenoid 31. The movable plate 34 is provided with a first connecting pin 34*a* and a second connecting pin 34*b* in addition to the rotating shaft of the pressing roller 32. The first connecting pin 34*a*, the second connecting pin 34*b*, and the rotating shaft are parallel to one another and are aligned in the front-back direction. The first connecting pin 34*a*, the second connecting pin 34*b*, and the rotating shaft are arranged in this order from a front toward a back.

The first connecting pin 34*a* provided on the movable plate 34 is inserted into an elongated hole (first elongated hole 35*a*) formed in the support plate 35, and the second connecting pin 34*b* provided on the movable plate 34 is inserted into an elongated hole (second elongated hole 36*a*) formed in the connecting plate 36. In other words, the first connecting pin 34*a* penetrates the support plate 35, while the second connecting pin 34*b* penetrates the connecting plate 36.

Here, the first elongated hole 35*a* formed in the support plate 35 extends in the front-back direction, and the second elongated hole 36*a* formed in the connecting plate 36 obliquely extends in a direction intersecting with the first elongated hole 35*a*. As a result of the first connecting pin 34*a* being inserted into the first elongated hole 35*a* that extends in the front-back direction and the second connecting pin 34*b* being inserted into the second elongated hole 36*a*, the movable plate 34 is movable backward and frontward, while cannot move upward and downward.

When a current is supplied to the first solenoid 31 based on the command of the controller 19, the rod is pulled up by an electromagnetic force and the connecting plate 36 rises. As such, the second connecting pin 34*b* provided on the movable plate 34 is pushed backward by an inner peripheral surface of the second elongated hole 36*a* formed in the connecting plate 36. As a result, the movable plate 34 moves backward. In this way, when the movable plate 34 is retracted, the pressing roller 32 moves backward and approaches the blade 30*a*.

When a pulling-up amount of rod of the first solenoid 31 reaches a predetermined amount, that is, when the connecting plate 36 rises up to a predetermined position, the pressing roller 32 contacts with the blade 30*a* and brings the blade 30*a* into pressure-contact with the rotated and driven flywheel 18. The flywheel 18 is rotated and driven clockwise in the paper surface shown in FIG. 1. Therefore, when the blade 30*a* is brought into pressure contact with the flywheel 18 by the pressing roller 32, the blade 30*a* is driven downward (in a driving direction) against energization of the first spring 33 and hits the nail 21*a* in the injection path 14. In other words, the blade 30*a* descends while compressing the first spring 33, and hits the nail 21*a*.

Meanwhile, when supply of a current to the first solenoid 31 is stopped based on a command of the controller 19, the rod is pushed down by a restoring force of a spring provided around the rod and the connecting plate 36 descends. As such, a second connecting pin 34*b* provided on the movable plate 34 is pushed forward by an inner peripheral surface of a second elongated hole 36*a* formed in the connecting plate 36. As a result, the movable plate 34 moves forward. When the movable plate 34 advances in this way, the pressing roller 32 moves forward and separates from the blade 30*a*. That is, the pressure contact of the blade 30*a* with the flywheel 18 by the pressing roller 32 is released. As such, the blade 30*a* is driven upward (counter-driving direction) by energization of the first spring 33, and retracts from the injection path 14. In other words, the blade 30*a* rises by an elastic restoring force of the first spring 33.

Figure 3:
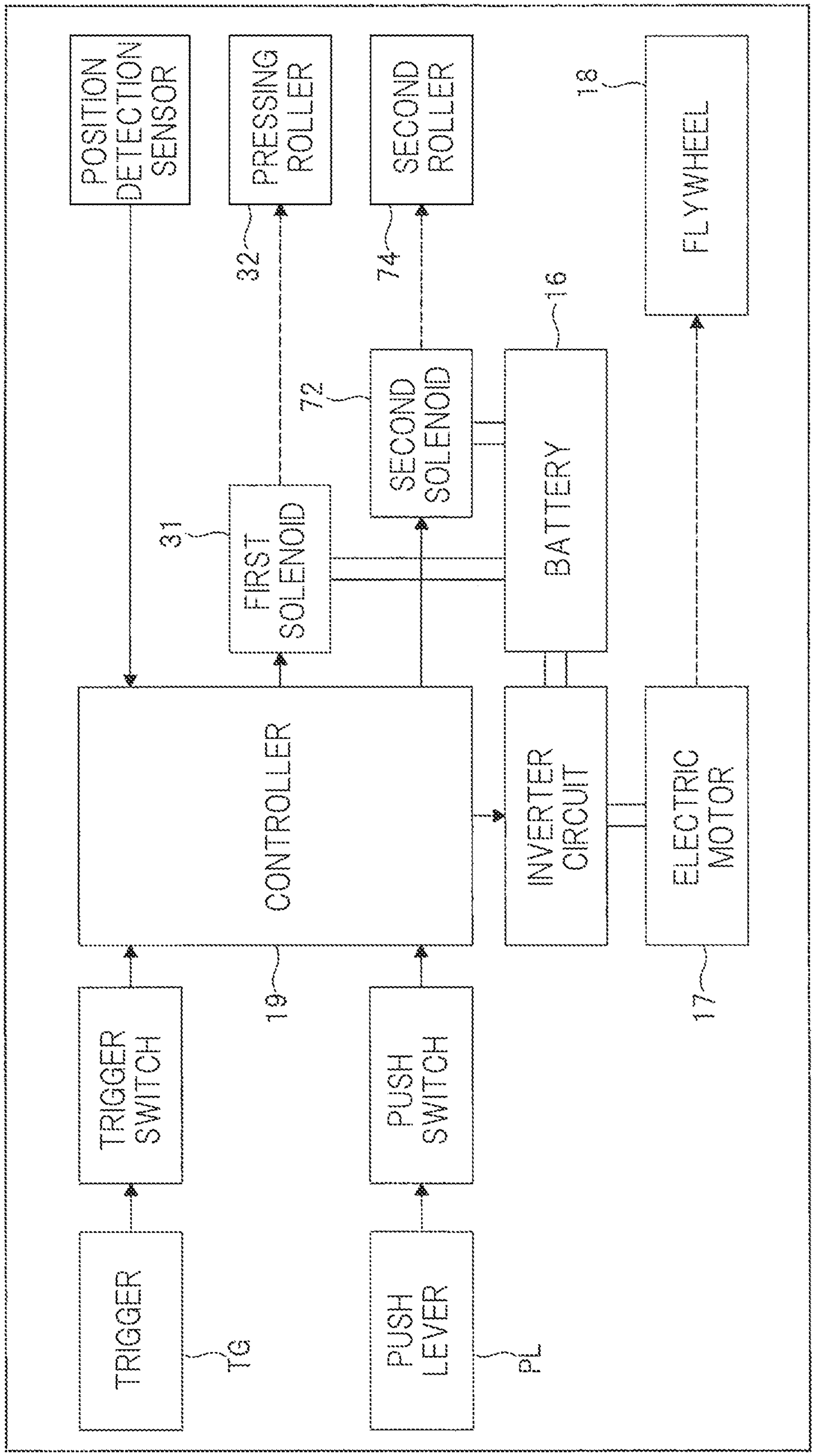
FIG. 3 is a block diagram showing a control system of the driving device according to the first embodiment.

The controller 19 shown in FIG. 1 moves up and down the blade 30*a* in a direction as described above if satisfying a predetermined condition. With reference to FIG. 3, the controller 19 is connected to a trigger switch that is turned ON/OFF by operating the trigger TG, and a push lever switch that is turned ON/OFF by operating a push lever PL. Then, when the push lever PL is pushed up while a main switch (not shown) is turned ON, an ON signal (push lever ON signal) outputted from the push lever switch is inputted to the controller 19. Further, when the trigger TG is operated while the main switch (not shown) is turned ON, an ON signal (trigger ON signal) outputted from the trigger switch is inputted to the controller 19. When the trigger ON signal is inputted following the input of the push lever ON signal, the controller 19 supplies and stops the current to the first solenoid 31 only once (single fire mode/trigger strike). Further, when the push lever ON signal is intermittently inputted while the trigger ON signal is inputted, the controller 19 supplies and stops a current to the first solenoid 31 each time the push lever ON signal i9 is inputted (bump fire mode/push strike). Incidentally, the controller 19 supplies a current to the electric motor 17 at predetermined timing to rotate the flywheel 18. For example, when the main switch is turned ON, the controller 19 supplies the current to the electric motor 17 via an inverter circuit to rotate the flywheel 18. In this case, the flywheel 18 continues to rotate while the main switch is turned ON. However, the controller may supply the current to the electric motor 17 to rotate the flywheel 18 according to an inputted status of the push lever ON signal or the trigger ON signal. In short, the driving of the electric motor 17 has only to be controlled by the controller 19 so as to realize a state in which the flywheel 18 is rotating at a predetermined rotation speed when the first solenoid 31 shown in FIG. 1 is activated and the blade 30*a* is brought into pressure contact with the flywheel 18. Further, as shown in FIG. 3, the driving device 1A according to the present embodiment includes a position detection sensor that detects a position of the blade 30*a*. The controller 19 grasps the position of the blade 30*a* based on a detection result of the position detection sensor.

Next, the details of a supply mechanism 50 shown in FIG. 1 will be described. The supply mechanism 50 has a feeder 60 that can reciprocate in a first direction (forward) approaching the injection path 14 and in a second direction (backward) away from the injection path 14. That is, the feeder 60 included in the supply mechanism 50 can reciprocate backward and forward. The supply mechanism 50 further includes: a power mechanism 70 including a movable member 71 displaceable between an operating position and a standby position; an energizing member (energizing mechanism) 80 that energizes the feeder 60 forward; and a stopper 81 that holds a position of the feeder 60 engaged with the movable member 71 and is moved in the second direction against energization of the energizing member 80.

A power mechanism 70 included in the supply mechanism 50 has a second actuator 72, a first roller 73, and a second roller 74 in addition to the movable member 71. The second actuator 72 is a solenoid actuator that operates based on the control of the controller 19 and displaces the movable member 71 between the operating position and the standby position. Incidentally, the movable member 71 shown in FIG. 1 is located at the standby position. In the following description, the second actuator 72 will be referred to as a "second solenoid 72".

The movable member 71 is provided at a tip of a movable iron core (rod) of the second solenoid 72, and is displaced at the operating position and the standby position with expansion and contraction of the rod. The first roller 73 is rotatably supported and is always abutting on the feeder 60. The second roller 74 is rotatably supported and is arranged among the flywheel 18, the movable member 71, and the first roller 73. Further, a support shaft that rotatably supports the second roller 74 can slide backward and forward. That is, the second roller 74 is rotatable and movable backward and forward.

The movable member 71 includes an oblique pressing surface 71*a* (FIG. 4) that abuts on the support shaft of the second roller 74. When a rod of the second solenoid 72 extends and the movable member 71 descends, the support shaft of the second roller 74 is pushed forward by the pressing surface 71*a* and the second roller 74 moves forward. Meanwhile, when the rod of the second solenoid 72 contracts and the movable member 71 rises, the support shaft of the second roller 74 returns to the original position and the second roller 74 moves backward. That is, the second roller 74 advances with the descending of the movable member 71, and retracts with the rising of the movable member 71.

As shown in FIG. 3, the second solenoid 72 is under the control of the controller 19. The second solenoid 72 shown in FIG. 1 moves the movable member 71 upward and downward based on the control of the controller 19, that is, the movable member 71 moves from the operating position to the standby position and the movable member 71 moves from the standby position to the operating position, so that two states are realized: a state in which a driving force for moving the feeder 60 backward is given the feeder 60; and a state in which the driving force for moving the feeder 60 backward is not given the feeder 60. Hereinafter, the operations of the blade drive mechanism 30 and the supply mechanism 50, which are collectively controlled by the controller 19 shown in FIG. 1, will be specifically described.

Figure 4B:
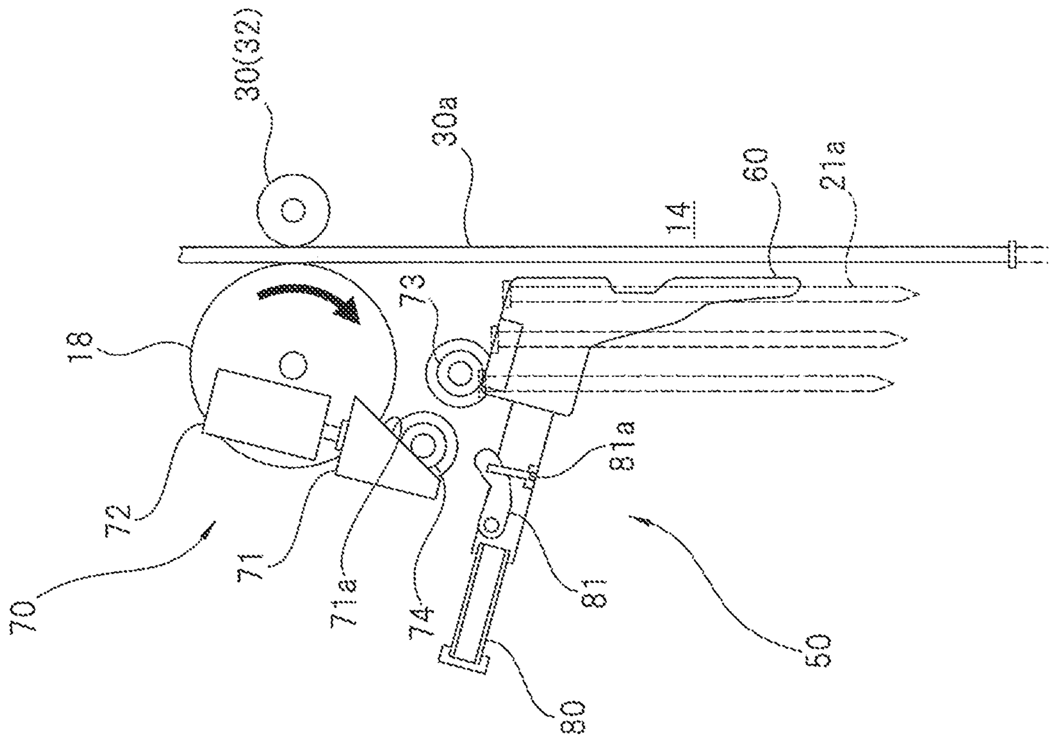
FIG. 4(*a*) is an explanatory diagram showing one step of a driving operation and a supply operation executed by the driving device according to the first embodiment, and (b) is an explanatory diagram showing another step.
Figure 4A:
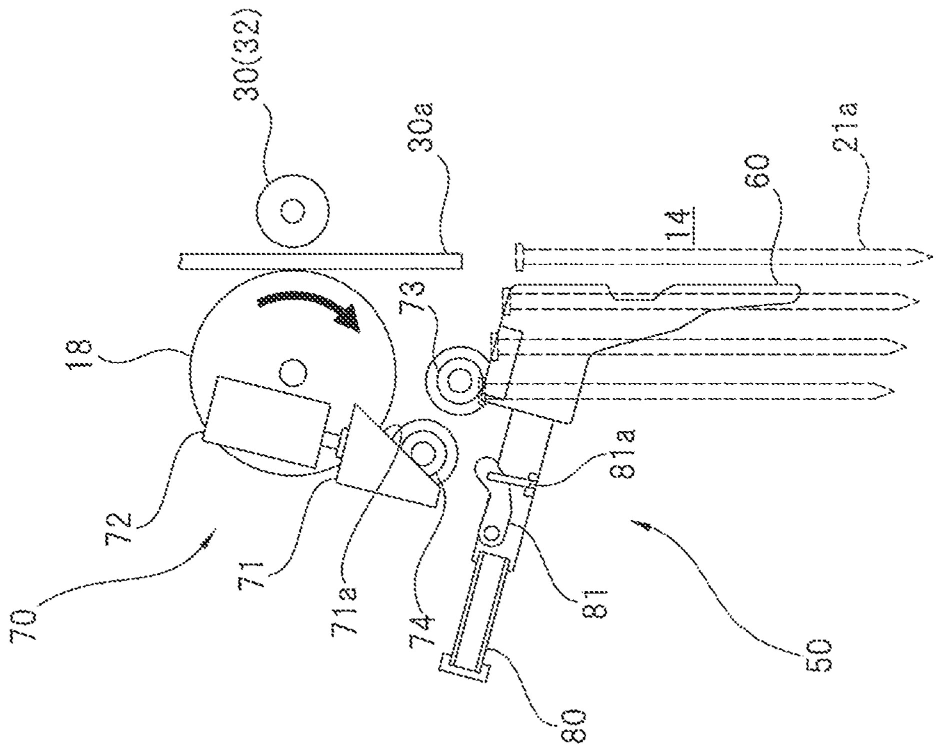

FIG. 4(*a*) shows respective initial states of the blade drive mechanism 30 and the supply mechanism 50. In the initial state, the flywheel 18 is rotating, while the pressing roller 32 of the blade drive mechanism 30 is separated from the blade 30*a* and the blade 30*a* is not brought into pressure contact with the flywheel 18. That is, the rod of the first solenoid 31 shown in FIG. 2 is extended, and the connecting plate 36 is descendent. Further, the rod of the second solenoid 72 in the supply mechanism 50 (power mechanism 70) is contracted, and the movable member 71 is at the standby position. At this time, the second roller 74 abuts on none of the flywheel 18 and the first roller 73. Furthermore, the stopper 81 is rotated upward by energization of a spring 81*a*, and the tip of the stopper 81 projects above the feeder 60.

Thereafter, when the predetermined condition is satisfied, the pressing roller 32 moves backward (on a left side of the paper surface) as shown in FIG. 4(*b*) and brings the blade 30*a* into pressure contact with the flywheel 18. Specifically, the current is supplied to the first solenoid 31 based on the command of the controller 19 shown in FIGS. 1 and 3, and the first solenoid 31 operates. As such, the rod of the first solenoid 31 shown in FIG. 1 contracts, and the connecting plate 36 rises. As a result, as shown in FIG. 4(*b*), the rotational force of the flywheel 18 is transmitted to the blade 30*a*, and the blade 30*a* is driven in the driving direction. The blade 30*a* driven in the driving direction hits the nail 21*a* that waits in the injection path 14.

Figure 5B:
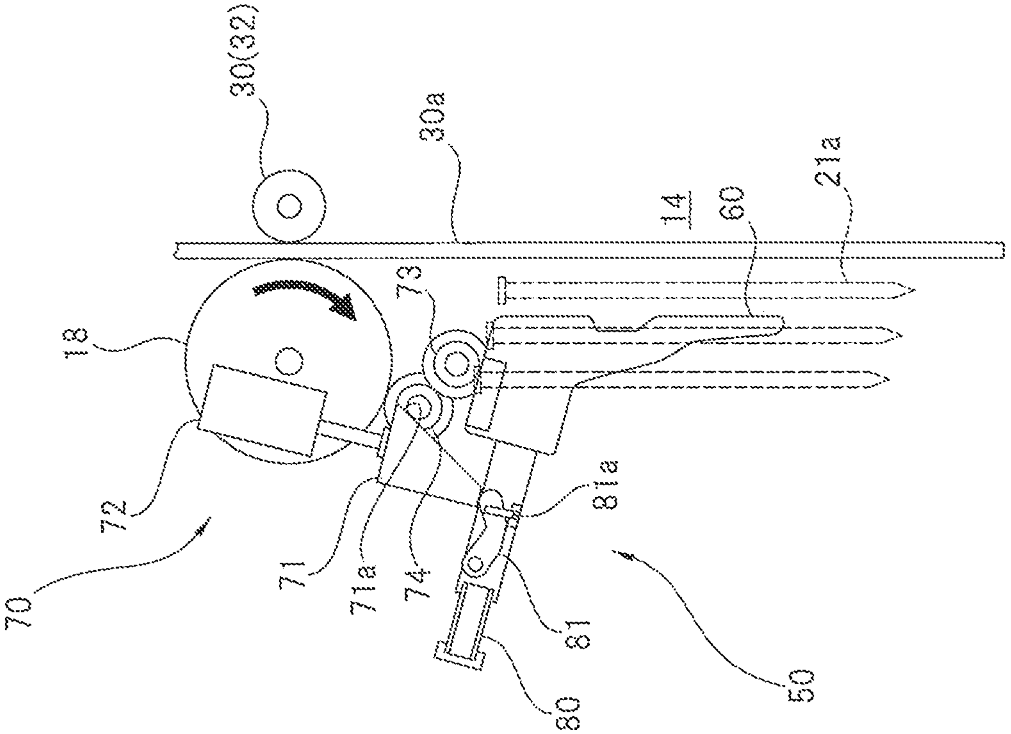
FIG. 5(*a*) is an explanatory diagram showing one step of a driving operation and a supply operation executed by the driving device according to the first embodiment, and (b) is an explanatory diagram showing another step.
Figure 5A:
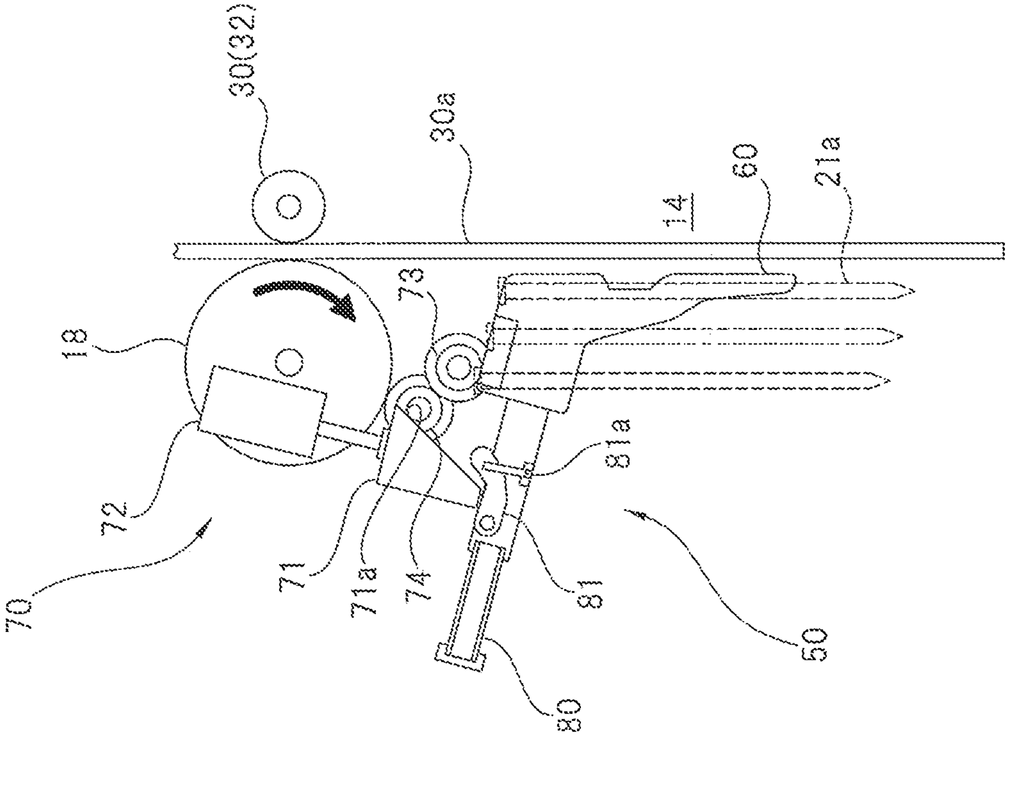

Thereafter, as shown in FIG. 5(*a*), the rod of the second solenoid 72 extends, and the movable member 71 is displaced from the standby position to the operating position. Specifically, the current is supplied to the second solenoid 72 based on the command of the controller 19 shown in FIGS. 1 and 3, and the second solenoid 72 operates. As shown in FIG. 5(*a*), the second roller 74 is pushed forward (on aright side of the paper surface) by a pressing surface 71*a* of the movable member 71 in a process of displacing the movable member 71 from the standby position to the operating position. Then, when the movable member 71 reaches the operating position, the second roller 74 advances up to a position where it abuts on both the flywheel 18 and the first roller 73.

When the movable member 71 reaches the operating position and the second roller 74 abuts on both the flywheel 18 and the first roller 73, the rotational force of the flywheel 18 is transmitted to the first roller 73 via the second roller 74 and the first roller 73 abutting on the feeder 60 rotates clockwise. In other words, the rotational force of the flywheel 18 is transmitted to the feeder 60 via the second roller 74 and the first roller 73.

The rotational force of the flywheel 18 transmitted to the feeder 60 as described above acts on the feeder 60 as a driving force for moving the feeder 60 backward. Therefore, as shown in FIG. 5(*b*), the feeder 60 to which the rotational force of the flywheel 18 is transmitted moves backward against the energization of the energizing member 80. Incidentally, the energizing member 80 in the present embodiment is a coil spring. With the retraction of the feeder 60, the stopper 81 integrated with the feeder 60 also moves backward. At this time, the tip of the stopper 81 abuts on the pressing surface 71*a* of the movable member 71 in the process of moving the stopper 81 backward. When the feeder 60 moves further backward, the stopper 81 rotates along an inclination of the pressing surface 71*a*. Specifically, the stopper 81 rotates clockwise while compressing the spring 81*a*.

Figure 6B:
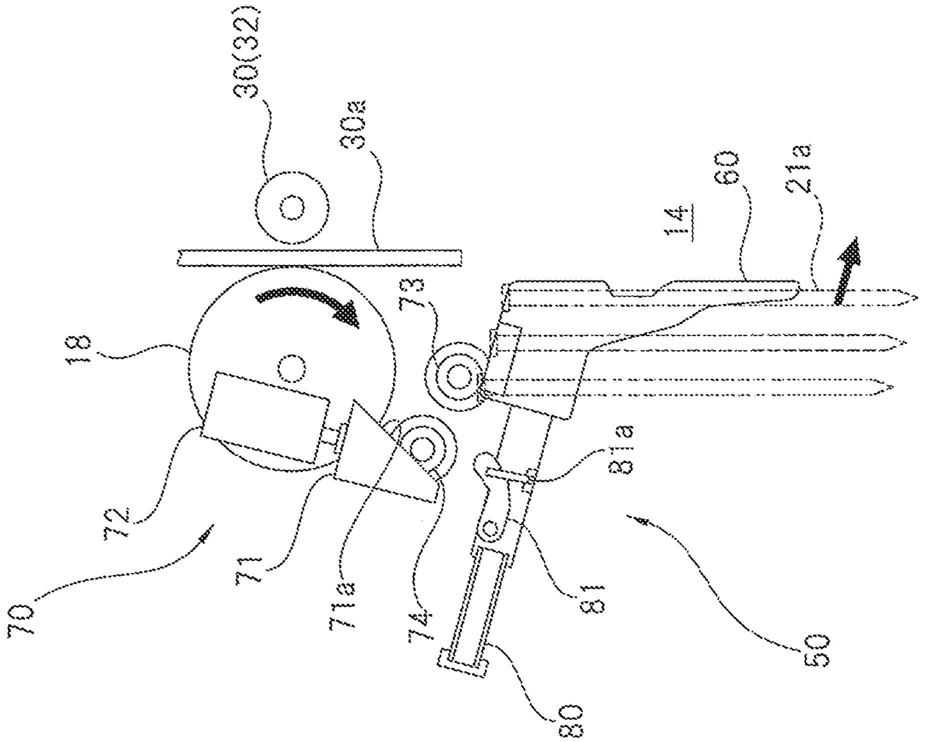
FIG. 6(*a*) is an explanatory diagram showing one step of a driving operation and a supply operation executed by the driving device according to the first embodiment, and (b) is an explanatory diagram showing another step.
Figure 6A:
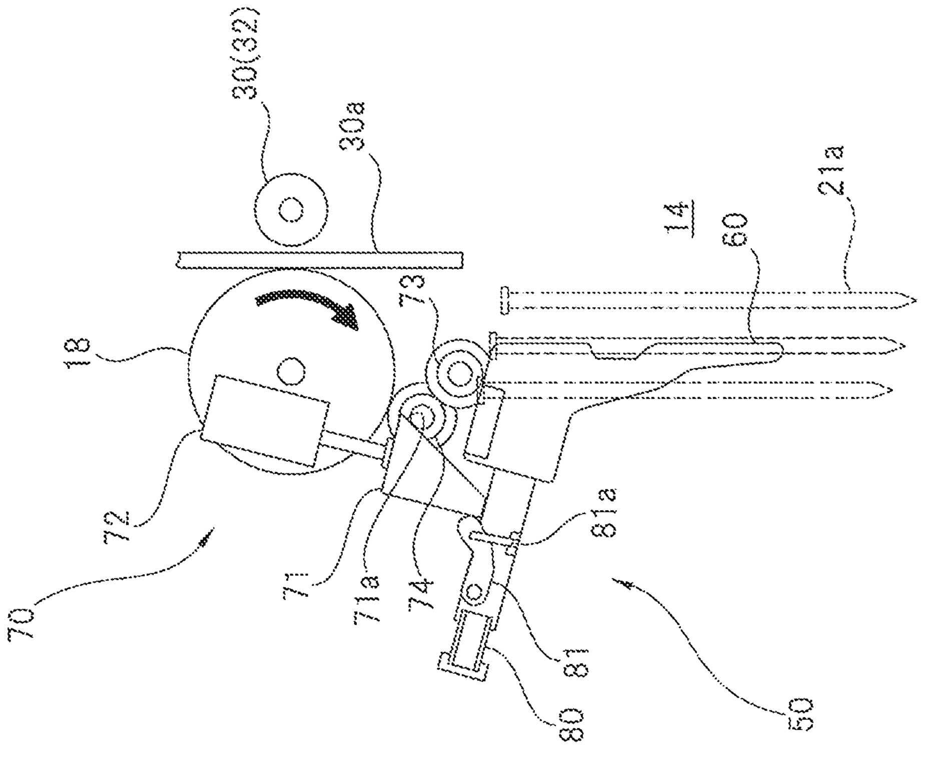

As shown in FIG. 6(*a*), when the feeder 60 moves further backward, the stopper 81 goes under the movable member 71 and reaches behind the movable member 71. The stopper 81 that has reached behind the movable member 71 rotates counterclockwise due to the energization of the spring 81*a*. As a result, the tip of the stopper 81 projects again above the feeder 60. The stopper 81 projecting above the feeder 60 abuts on a back surface (a surface opposite to the pressing surface 71*a*) of the movable member 71, and prevents the feeder 60 moving forward by the energization of the energizing member 80. That is, the stopper 81 that has passed through the movable member 71 temporarily prevents forward movement of the feeder 60, and the position of the feeder 60 is maintained (held).

At the same time as the stopper 81 passes through the movable member 71 or after a predetermined time has elapsed from a time when the stopper 81 passed through the movable member 71, the supply of the current to the first solenoid 31 is stopped based on the command of the controller 19 shown in FIGS. 1 and 3. As such, the rod of the first solenoid 31 is extended, and the connecting plate 36 descends. As a result, as shown in FIG. 6(*a*), the pressing roller 32 is separated from the blade 30*a*, and the pressure contact of the blade 30*a* with respect to the flywheel 18 due to the pressing roller 32 is released. The blade 30*a* which has released the pressure contact with the flywheel 18 is driven in a counter-driving direction by the energization of the first spring 33 (FIG. 1).

After the blade 30*a* moves above a region where the faster 21*a* in the injection path 14 is supplied, as shown in FIG. 6(*b*), the movable member 71 is displaced to the standby position. Specifically, the second solenoid 72 operates based on the command of the controller 19 shown in FIGS. 1 and 3. More specifically, the rod of the second solenoid 72 is pulled back, and the movable member 71 rises. As a result, as shown in FIG. 6(*b*), the second roller 74 moves backward and is separated from the flywheel 18 and the first roller 73. When the second roller 74 is separated from the flywheel 18 and the first roller 73, the rotational force of the flywheel 18 is not transmitted to the feeder 60. Further, with the rising of the movable member 71, restriction on the forward movement of the feeder 60 by the stopper 81 is also released. That is, holding of the position of the feeder 60 by the stopper 81 is released. As such, the feeder 60 moves forward due to the energization of the energizing member 80, and the nail 21*a* is sent out to the injection path 14. In this way, a series of driving operations and supply operations are completed, and the blade drive mechanism 30 and the supply mechanism 50 return to the initial states.

The driving device 1A according to the present embodiment has: a first solenoid 31 that realizes a state in which the driving force outputted from the electric motor 17 is transmitted to the blade 30*a* and a state in which the driving force is not transmitted thereto; and a second solenoid 72 that realizes a state in which the driving force outputted from the electric motor 17 is transmitted to the feeder 60 and a state in which the driving force is not transmitted thereto. Further, the first solenoid 31 and the second solenoid 72 can operate independently of each other. Therefore, each of the first solenoid 31 and the second solenoid 72 can be operated at the optimum timing. That is, each of the blade 30*a* and the feeder 60 can be driven at the optimized timing.

In addition, in the driving device 1A according to the present embodiment, the blade 30*a* and the feeder 60 are driven by a common drive source (electric motor 17). Therefore, it is possible to avoid an increase in the number of parts and an increase in the size of a housing.

Figure 7:
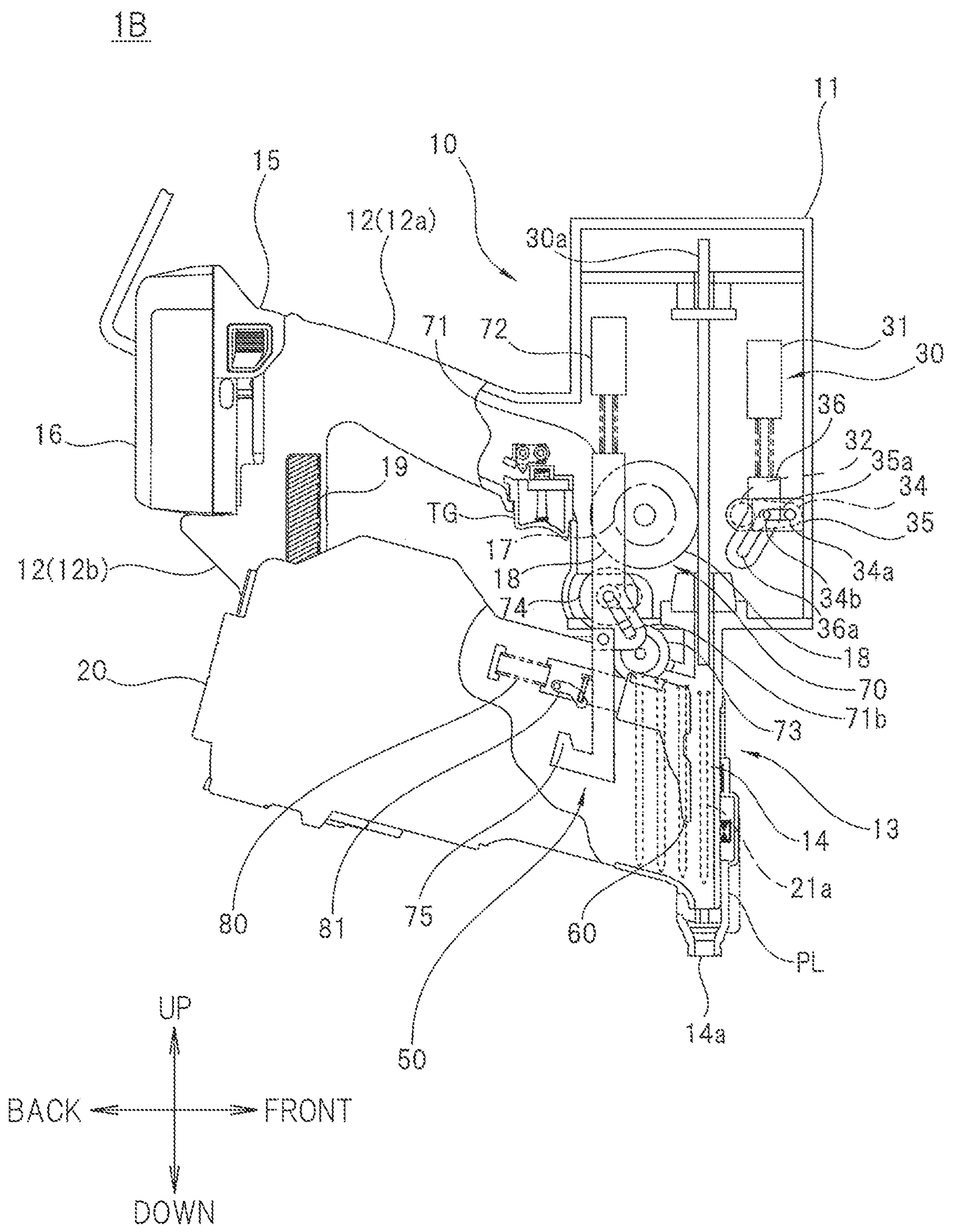
FIG. 7 is a schematic view showing a whole configuration of a driving device according to a second embodiment.

(Second Embodiment) Hereinafter, another example of the driving device to which the present invention is applied will be described in detail with reference to the drawings. FIG. 7 is a schematic view showing an overall configuration of a driving device 1B according to the present embodiment. The driving device 1B according to the present embodiment has the same basic structure as the driving device 1A (FIG. 1) according to the first embodiment, and operates in the same manner as the driving device 1A. Thus, a description of a configuration or operation that is the same as or substantially the same as the configuration or operation already described will be omitted. Further, the same reference numerals will be used for configurations that are the same as or substantially the same as the configurations already described.

As shown in FIG. 7, the driving device 1B according to the present embodiment has a blade drive mechanism 30. The blade drive mechanism 30 included in the driving device 1B has the same structure as the blade driving mechanism 30 (FIG. 1) included in the driving device 1A, and operates in the same manner as the blade driving mechanism 30 included in the driving device 1A.

As shown in FIG. 7, the driving device 1B according to the present embodiment has a supply mechanism 50 including a power mechanism 70. The supply mechanism 50 and the power mechanism 70 of the driving device 1B have substantially the same structures as the supply mechanism 50 (FIG. 1) and the power mechanism 70 (FIG. 1) of the driving device 1A, and operate in substantially the same manners as the supply mechanism 50 and the power mechanism 70 of the driving device 1A. That is, the power mechanism 70 included in the supply mechanism 50 that the driving device 1B has includes a movable member 71 displaced between an operating position and a standby position by the second solenoid 72 under control of the controller 19. Then, when the movable member 71 is displaced from the standby position to the operating position, the second roller 74 abuts on both the flywheel 18 and the first roller 73, and the rotational force of the flywheel 18 is transmitted to the feeder 60. Meanwhile, when the movable member 71 is displaced from the operating position to the standby position, the second roller 74 is separated from the flywheel 18 and the first roller 73 and the rotational force of the flywheel 18 is not transmitted to the feeder 60.

However, the driving device 1B according to the present embodiment and the driving device 1A according to the first embodiment are slightly different in the movable member 71 constituting the power mechanism 70. Hereinafter, the movable member 71 in the driving device 1B according to the present embodiment will be described, and then the operation of the supply mechanism 50 included in the driving device 1B according to the present embodiment will be specifically described.

As shown in FIG. 7, the movable member 71 in the driving device 1B according to the present embodiment has a vertically elongated plate shape. An upper end of the movable member 71 is connected to the rod of the second solenoid 72, and a lower end of the movable member 71 is provided with a hook-shaped engaging portion 75. Further, formed in the movable member 71 are a second elongated hole 36*a* formed in the connecting plate 36 and a reverse-inclination elongated hole (third elongated hole 71*b*). Then, a support shaft that rotatably supports the second roller 74 is inserted through a third elongated hole 71*b* formed in the movable member 71.

Figure 8B:
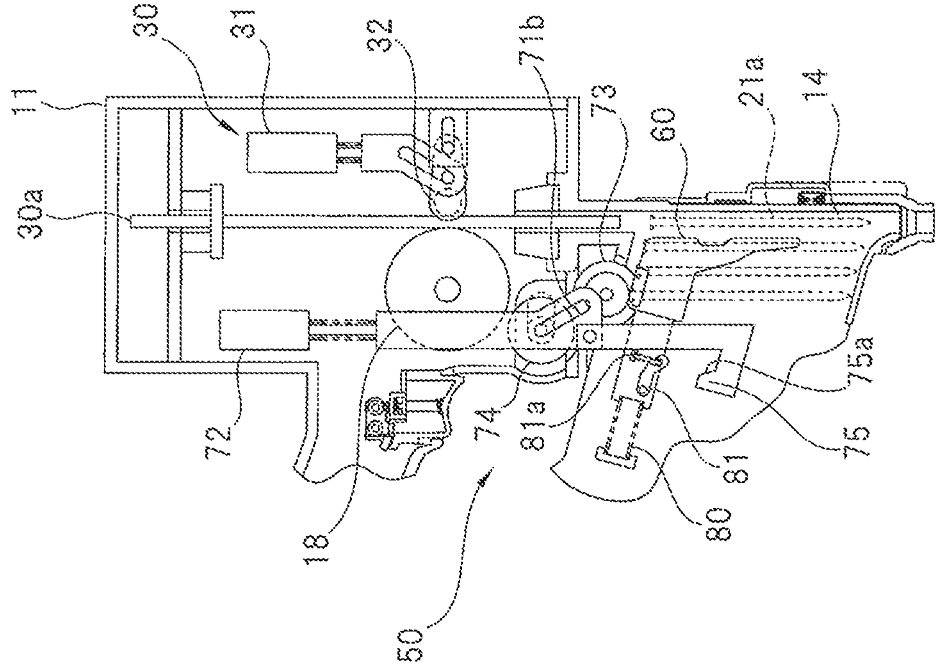
FIG. 8(*a*) is an explanatory diagram showing one step of a driving operation and a supply operation executed by the driving device according to the second embodiment, and (b) is an explanatory diagram showing another step.
Figure 8A:
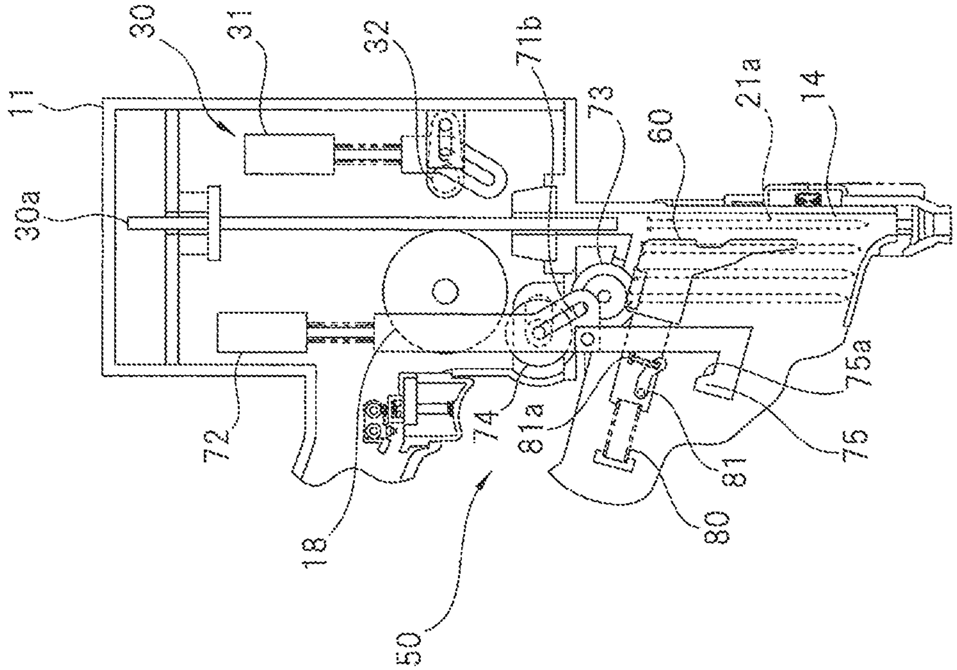

FIG. 8(*a*) shows initial states of the blade drive mechanism 30 and the supply mechanism 50. In the initial state, the flywheel 18 is rotating, while the pressing roller 32 of the blade driving mechanism 30 is separated from the blade 30*a* and the blade 30*a* is not in pressure contact with the flywheel 18. At this time, the stopper 81 is rotated downward by the energization of the spring 81*a*, and the tip of the stopper 81 projects below the feeder 60. Incidentally, in the first embodiment, the stopper 81 in the initial state is rotated upward by the energization of the spring 81*a*, and the tip of the stopper 81 projects above the feeder 60.

Thereafter, when the predetermined condition is satisfied, the blade 30*a* is caused to abut on the flywheel 18 by the pressing roller 32, as shown in FIG. 8(*b*). As such, as shown in FIG. 9(*a*), the blade 30*a* is driven in the driving direction by the rotational force of the flywheel 18.

Figure 9B:
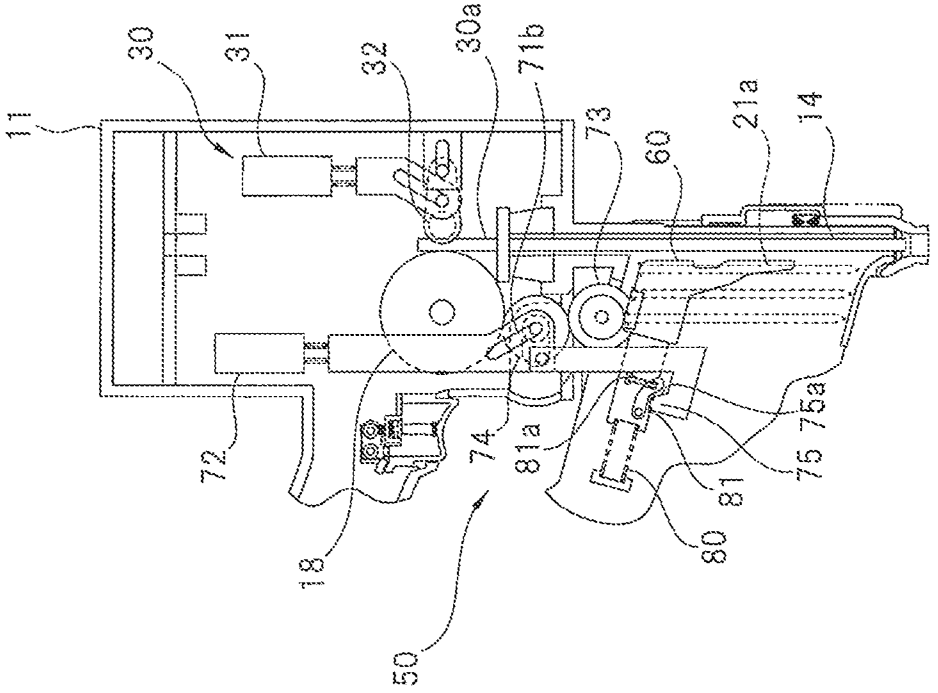
FIG. 9(*a*) is an explanatory diagram showing one step of a driving operation and a supply operation executed by the driving device according to the second embodiment, and (b) is an explanatory diagram showing another step.
Figure 9A:
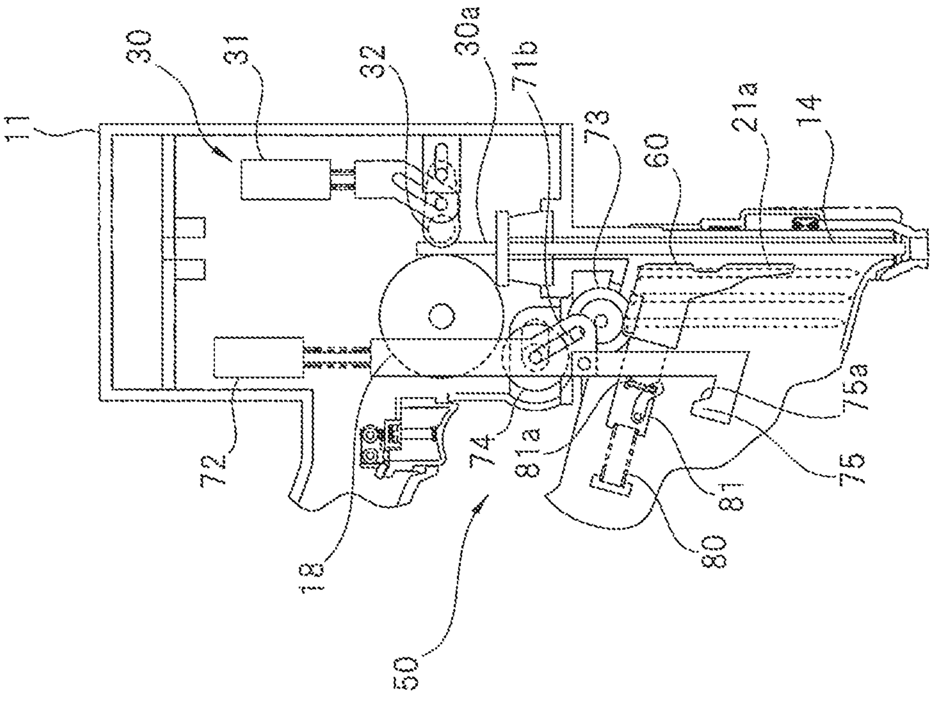

Then, as shown in FIG. 9(*b*), the movable member 71 is displaced from the standby position to the operating position. Specifically, the rod of the second solenoid 72 of the supply mechanism 50 (power mechanism 70) contracts, and the movable member 71 is pulled up. The support shaft of the second roller 74 is pushed forward (on the right side of the paper surface) by an inner peripheral surface of the third elongated hole 71*b* in a process of the movable member 71 displacing from the standby position to the operating position. As a result, the second roller 74 is pushed forward. Then, when the movable member 71 reaches the operating position, the second roller 74 advances up to a position where abutting on both the flywheel 18 and the first roller 73. Incidentally, the movable member 71 in the first embodiment is displaced from the standby position to the operating position by moving downward, but the movable member 71 in the present embodiment is displaced from the standby position to the operating position by moving upward.

When the movable member 71 reaches the operating position and the second roller 74 abuts on both the flywheel 18 and the first roller 73, the rotational force of the flywheel 18 is transmitted to the feeder 60 via the second roller 74 and the first roller 73. Incidentally, the rotational force of the flywheel 18 transmitted to the feeder 60 acts as the driving force for moving the feeder 60 backward, and this is the same as that of the first embodiment.

Figure 10B:
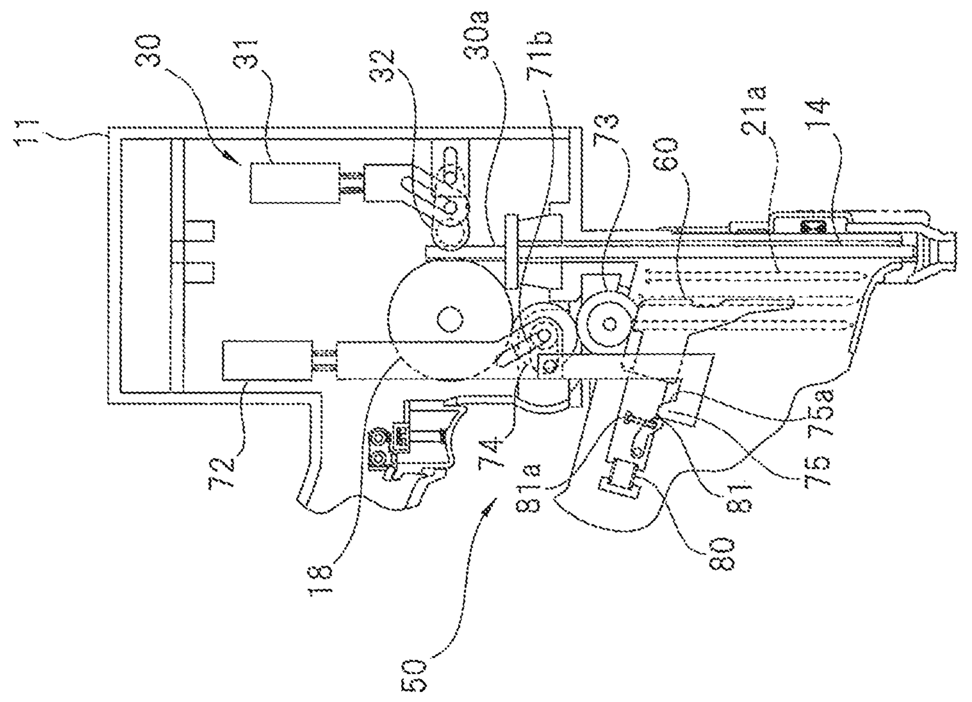
FIG. 10(*a*) is an explanatory diagram showing one step of a driving operation and a supply operation executed by the driving device according to the second embodiment, and (b) is an explanatory diagram showing another step.
Figure 10A:
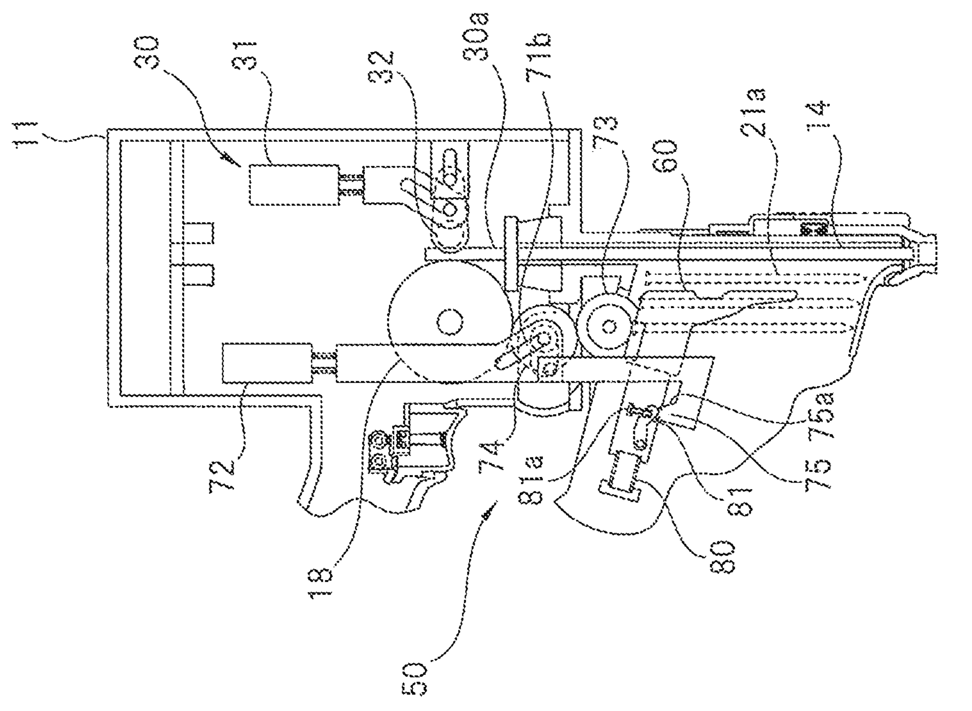

As shown in FIG. 10(*a*), the feeder 60 to which the rotational force of the flywheel 18 is transmitted moves backward against the energization of the energizing member 80. At the same time, the stopper 81 integrated with the feeder 60 also moves backward. At this time, the tip of the stopper 81 abuts on an inclined front surface 75*a* of the engaging portion 75 in a process of the stopper 81 moving backward. When the feeder 60 moves further backward, the stopper 81 rotates along an inclination of the front surface 75*a*. Specifically, the stopper 81 rotates counterclockwise while compressing the spring 81*a*.

As shown in FIG. 10(*b*), when the feeder 60 moves further backward, the stopper 81 gets over the movable member 71 (engagement portion 75) and reaches behind the movable member 71. The stopper 81 that reaches behind the movable member 71 rotates clockwise due to the energization of the spring 81*a*. As a result, the tip of the stopper 81 projects again below the feeder 60. The stopper 81 projecting again below the feeder 60 abuts on a back surface (a surface opposite to the front surface 75*a*) of the engagement portion 75 of the movable member 71, and the feeder 60 is prevented moving forward due to the energization of the energization member 80. That is, the forward movement of the feeder 60 by the stopper 81 that has passed through the movable member 71 is temporarily prevented, and the position of the feeder 60 is held.

Figure 11B:
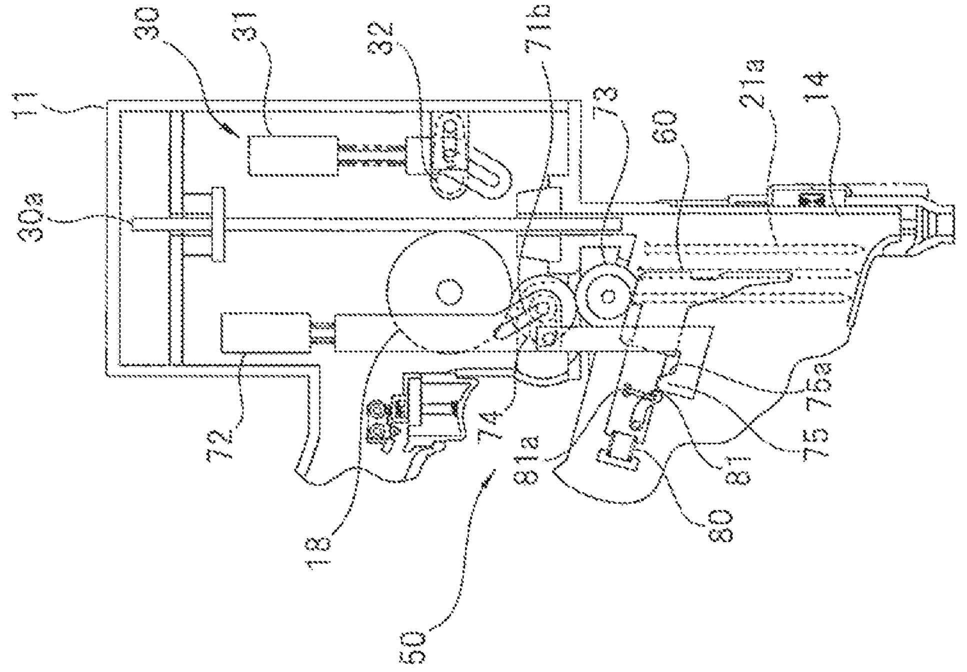
FIG. 11(*a*) is an explanatory diagram showing one step of a driving operation and a supply operation executed by the driving device according to the second embodiment, and (b) is an explanatory diagram showing another step.
Figure 11A:
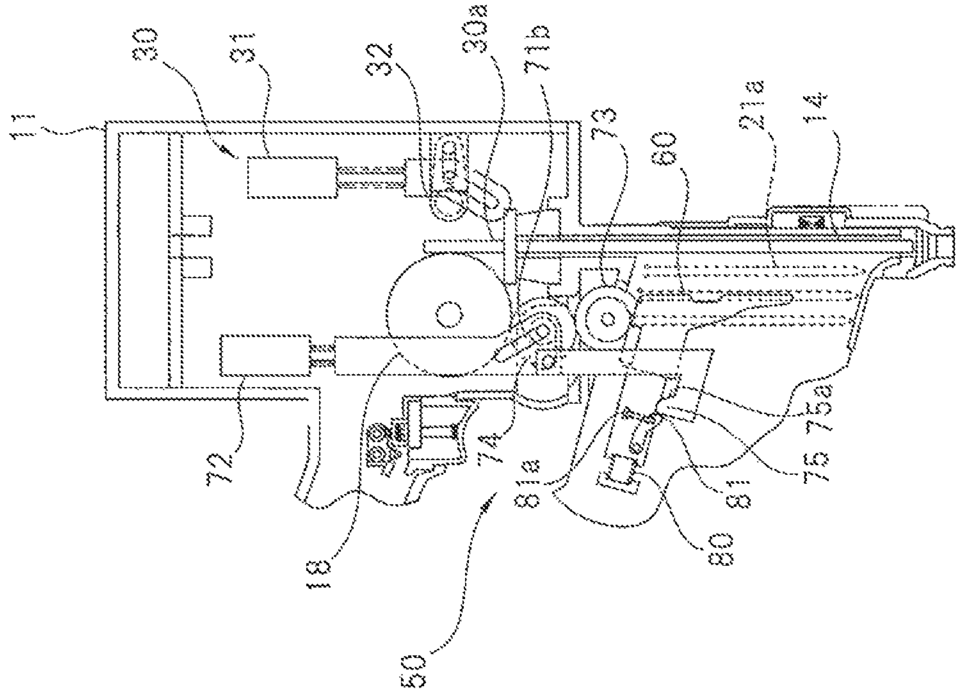

As shown in FIG. 11(*a*), the pressing roller 32 is released from the blade 30*a* at the same time as the stopper 81 passes through the movable member 71 or after a predetermined time has elapsed from the time when the stopper 81 has passed through the movable member 71. As a result, the pressure contact of the blade 30*a* with the flywheel 18 by the pressing roller 32 is released. As such, as shown in FIG. 11(*b*), the blade 30*a* is driven in the counter-driving direction by the energization of the not-shown first spring.

Figure 12B:
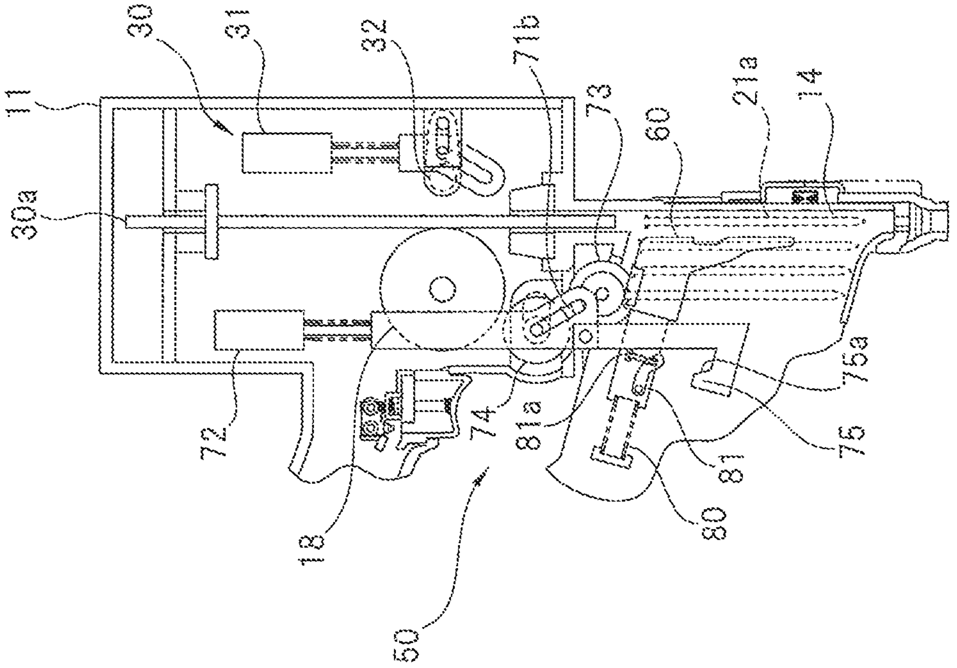
FIG. 12(*a*) is an explanatory diagram showing one step of a driving operation and a supply operation executed by the driving device according to the second embodiment, and (b) is an explanatory diagram showing another step.
Figure 12A:
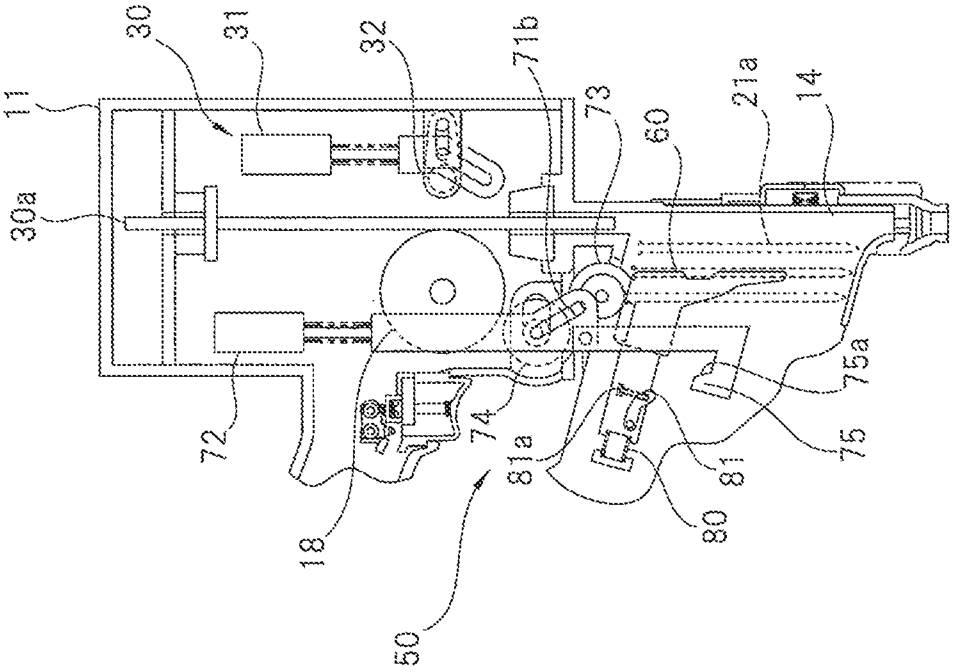

Thereafter, as shown in FIG. 12(*a*), the movable member 71 is displaced from the operating position to the standby position. Specifically, the rod of the second solenoid 72 of the supply mechanism 50 (power mechanism 70) is extended, and the movable member 71 is pushed downward. The support shaft of the second roller 74 is pushed backward (on the left side of the paper surface) by an inner peripheral surface of the third elongated hole 71*b* in the process of displacing the movable member 71 from the operating position to the standby position. As a result, the second roller 74 is pulled back backward. At the same time, by the descent of the movable member 71, the engagement between the movable member 71 (engaging portion 75) and the stopper 81 is released. Incidentally, the movable member 71 in the first embodiment is displaced from the operating position to the standby position by moving upward, but the movable member 71 in the present embodiment is displaced from the operating position to the standby position by moving downward.

When the second roller 74 is separated from the flywheel 18 and the first roller 73, the rotational force of the flywheel 18 is not transmitted to the feeder 60. Further, when the engagement between the movable member 71 (engaging portion 75) and the stopper 81 is released, the restriction on the forward movement of the feeder 60 by the stopper 81 is also released. That is, the retainment of the position of the feeder 60 by the stopper 81 is released. As such, the feeder 60 moves forward due to the energization of the energizing member 80, and the nail 21*a* is sent out to the injection path 14. In this way, a series of driving operations and supply operations are completed, and the blade driving mechanism 30 and the supply mechanism 50 return to the initial states.

Also in the driving device 1B according to the present embodiment, each of the blade 30*a* and the feeder 60 can be driven at the optimized timing. Further, since the blade 30*a* and the feeder 60 are driven by the common drive source (electric motor 17), an increase in the number of parts and an increase in the size of the housing can be avoided.

The present invention is not limited to the above embodiments, and various modifications can be made without departing from the scope thereof. For example, in the first embodiment and the second embodiment, a solenoid actuator (second solenoid 72) is used as an actuator displacing the movable member 71, which is included in the power mechanism 70, at the operating position and the standby position. Further, the second solenoid 72 in the first embodiment and the second embodiment linearly moves (vertically moves) the movable member 71. However, the actuator displacing the movable member, which constitutes the power mechanism, at the operating position and the standby position is not limited to the solenoid actuator. The driving device of the present invention also includes the driving device that uses the electric motor as the actuator displacing the movable member at the operating position and the standby position.

Figure 13:
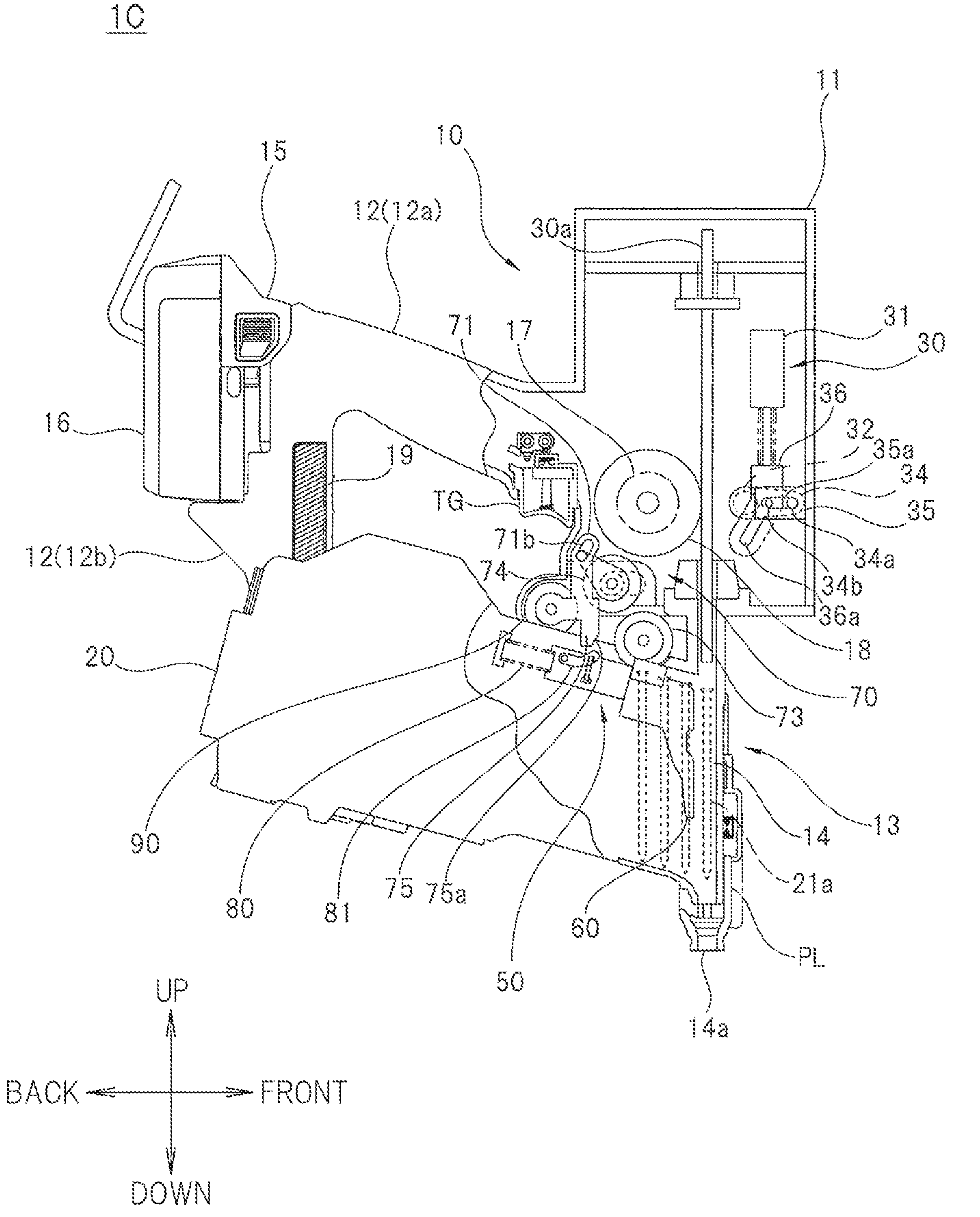
FIG. 13 is a schematic view showing another example of a driving device of the present invention, and is a schematic view of a state in which a movable member is at a standby position.
Figure 14:
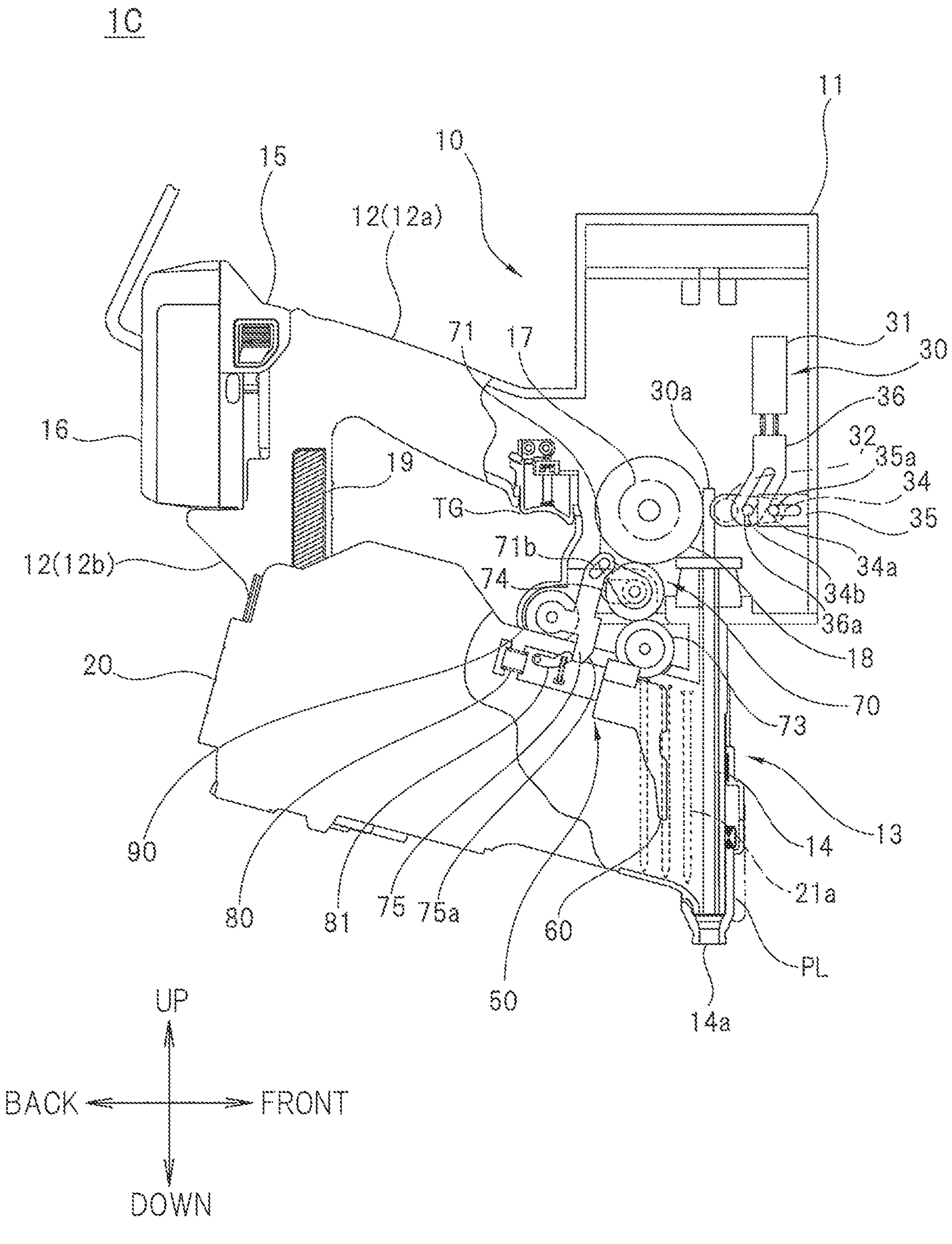
FIG. 14 is a schematic view showing another example of a driving device of the present invention, and is a schematic view of a state in which a movable member is at an operating position.

For example, a driving device 1C shown in FIGS. 13 and 14 includes a second electric motor 90 different from the electric motor 17, and the movable member 71 is displaced by the second electric motor 90. The second electric motor 90 included in the driving device 1C shown in FIGS. 13 and 14 is a servomotor controlled by the controller 19. A servomotor 90 displaces (rotates) the movable member 71 from the standby position (FIG. 13) to the operating position (FIG. 14) according to the control of the controller 19, and also displaces (rotates) the movable member 71 from the operating position (FIG. 14) to the standby position (FIG. 13). Incidentally, the movement of the second roller 74 with the displacement (rotation) of the movable member 71 is the same as those of the first embodiment and the second embodiment.

Figure 15:
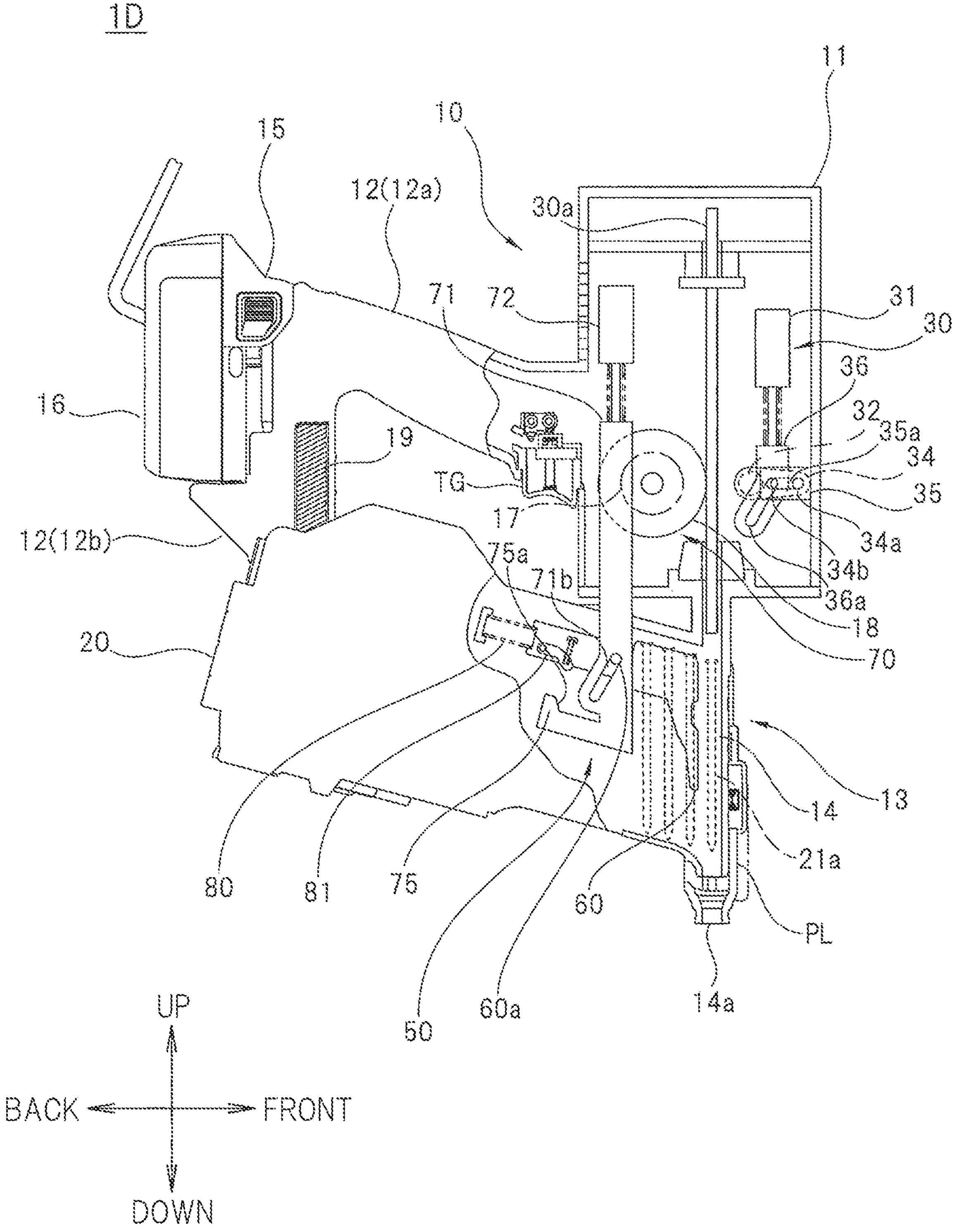
FIG. 15 is a schematic view showing still another example of the embodiment of the driving device of the present invention.

In the driving devices 1A, 1B, and 1C according to the respective above-mentioned embodiments, the blade 30*a* and the feeder 60 are driven by the common drive source (electric motor 17). However, the driving device of the present invention also includes a driving device having a drive source for the blade and a drive source for the feeder separately. For example, a driving device 1D shown in FIG. 15 does not include the first roller 73 and the second roller 74 in each of the above embodiments. The driving device 1D shown in FIG. 15 directly reciprocates the feeder 60 by the same principle as that in which the driving device 1B according to the second embodiment reciprocates the second roller 74 (FIG. 7). Specifically, in the driving device 1D shown in FIG. 15, a pin 60*a* provided in the feeder 60 is inserted into a third elongated hole 71*b* formed in the movable member 71. Therefore, when the movable member 71 is pulled up by the second solenoid 72 (when the movable member 71 is displaced from the standby position to the operating position), the pin 60*a* provided in the feeder 60 is pushed backward and the feeder 60 is retreated against the energization of the energizing member 80. In other words, the driving force of the second solenoid 72 is directly transmitted to the feeder 60 with the displacement of the movable member 71 from the standby position to the operating position. Meanwhile, when the movable member 71 is pushed down by the second solenoid 72 (when the movable member 71 is displaced from the operating position to the standby position), the driving force of the second solenoid 72 is not transmitted to the feeder 60 and the engagement between the movable member 71 and the stopper 81 is released. As a result, the feeder 60 advances by the energization of the energizing member 80.

As described above, in the driving device 1D shown in FIG. 15, the driving force outputted from the electric motor 17 is used only for driving the blade 30*a*, not for driving the supply mechanism 50. In the driving device 1D shown in FIG. 15, the feeder 60 is driven by a driving force outputted from a second solenoid 72 which is a driving source different from the electric motor 17. Therefore, even in the driving device 1D, each of the blade 30*a* and the feeder 60 can be driven at the optimized timing.

Each of the driving devices 1A to 1D according to the respective above-mentioned embodiments has been a flywheel type driving device that drives the blade by utilizing the rotational force of a rotating body. However, the driving device of the present invention also includes a driving device other than the flywheel type driving device. For example, the driving device of the present invention also includes a hoisting type driving device having: a rotating body that is rotated and driven by an electric motor; a plurality of first engaging portions provided on the rotating body; a plurality of second engaging portions provided on the blade; and a spring (including an air spring) that energizes the blade in a driving direction. The plurality of first engaging portions are realized by, for example, a plurality of pins or the like provided on the rotating body along a rotation direction of the rotating body. Further, the plurality of second engaging portions are realized by, for example, a plurality of grooves or the like provided in the blade along a longitudinal direction of the blade. Then, when the rotating body is rotated and driven by the electric motor, the plurality of first engaging portions provided on the rotating body and the plurality of second engaging portions provided on the blade are sequentially engaged with one another and the blade is driven in the counter-driving direction against the energization of the spring. Thereafter, when the engagement between the first engaging portion and the second engaging portion is released, the blade is driven in the driving direction by the energization of the spring. That is, the rotating body of the hoisting type driving device corresponds to the flywheel 18 in each of the above-mentioned embodiments. Therefore, the rotational force of the rotating body of the hoisting type driving device is transmitted to the feeder via the same or substantially the same mechanism as the power mechanism. 70 in each of the above-mentioned embodiments, which also makes it possible to reciprocate the feeder.

A fan(s) or fin(s) that rotates with the rotation of the rotating body and generates cooling air for cooling an actuator (for example, the first solenoid 31, the second solenoid 72, and the servomotor 90, etc.) may be provided. For example, a fan having a plurality of fins may be attached to the rotating body or a rotating shaft of the rotating body. Further, a plurality of fins may be formed on a surface of the rotating body.

In the driving device in each of the above-mentioned embodiments, a driving force for moving the feeder in the second direction is applied to the feeder via some member (for example, a movable member driven by the actuator). However, the driving device of the present invention also includes a driving device in which the driving force for moving the feeder in the second direction is directly applied to the feeder. For example, the driving device of the present invention also includes a driving device in which the feeder is directly moved in the second direction by a solenoid actuator as the power mechanism.

Figure 16:
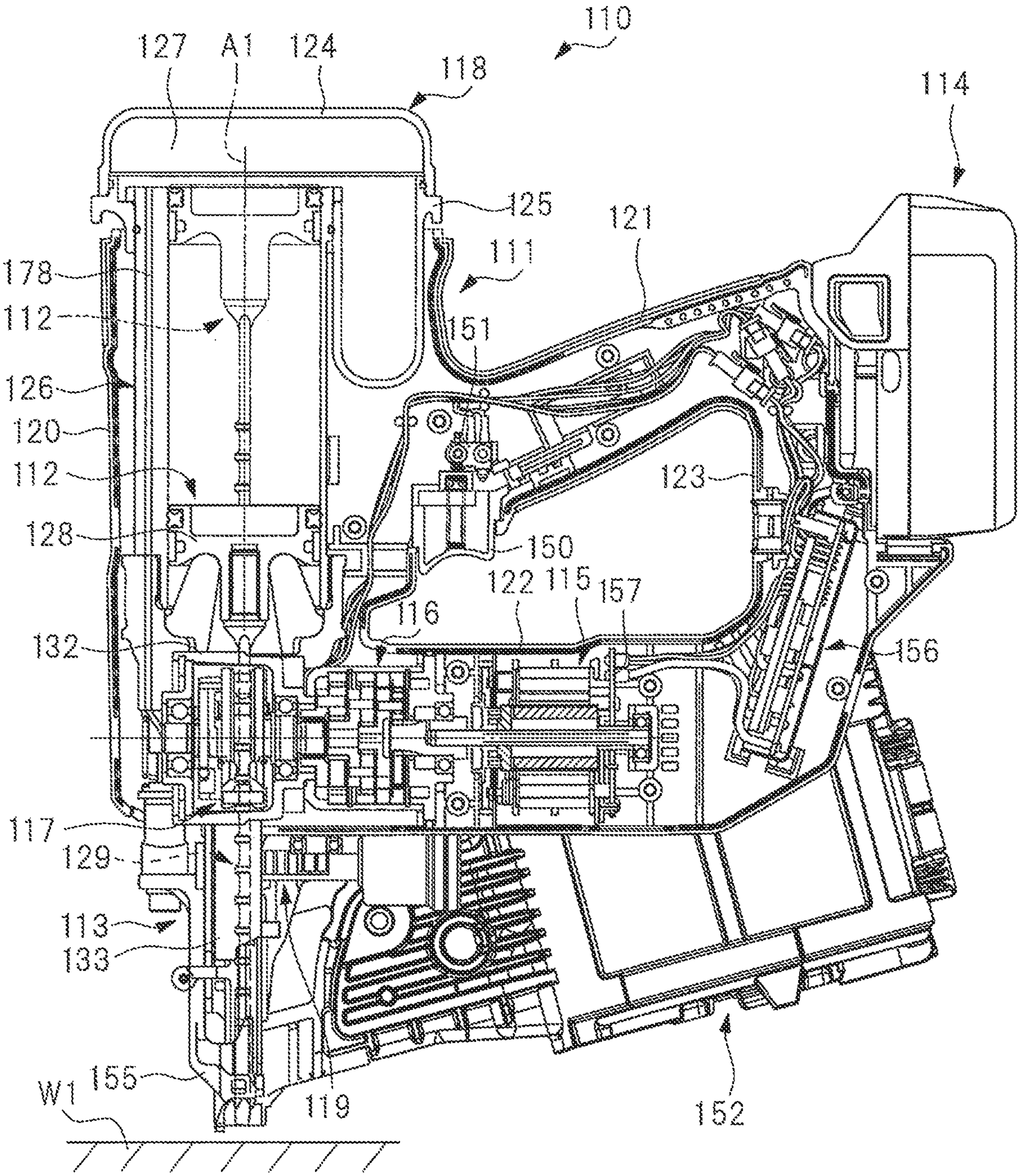
FIG. 16 is a side sectional view showing a whole of a driving device according to a third embodiment.

(Third Embodiment) Hereinafter, another example of the driving device to which the present invention is applied will be described in detail with reference to the drawings. A driving device 110 according to the present embodiment has the same basic configuration as that of the driving device A (FIG. 1) according to the first embodiment, and operates in the same manner as the driving device 1A. Therefore, the description of the configuration or operation that is the same as or substantially the same as the configuration or operation already described will be omitted. In other words, the matters not particularly described are the same as those of the driving device 1A according to the first embodiment. The driving device 110 shown in FIG. 16 is a nail driving device, and the driving device 110 includes a housing 111, a striking portion 112, a nose portion 113, a power supply unit 114, an electric motor 115, a speed reduction mechanism 116, a conversion portion 117, and an accumulator container 118, and a supply mechanism 119. The housing 111 includes a cylinder case 120, a handle 121 connected to the cylinder case 120, a motor case 122 connected to the cylinder case 120, and a mounting portion 123 connected to the handle 121 and the motor case 122.

The accumulator container 118 is fixed to the housing 111. The accumulator container 118 has a head cover 124 and a holder 125 to which the head cover 124 is attached. Both the head cover 124 and the holder 125 are made of metal, for example, aluminum or iron.

The cylinder 126 is housed in the cylinder case 120. The cylinder 126 is made of metal, for example aluminum or iron. The holder 125 is annular, and the holder 125 is attached to an outer peripheral surface of the cylinder 126. The accumulator chamber 127 is through formed in the accumulator container 118 and in the cylinder 126. The accumulator chamber 127 is filled with compressed fluid. Air or an inert gas can be used as the compressed fluid. The inert gas includes, for example, nitrogen gas and noble gas. In the present disclosure, an example in which the accumulator chamber 127 is filled with air at pressure higher than the atmospheric pressure will be described.

Figure 17:
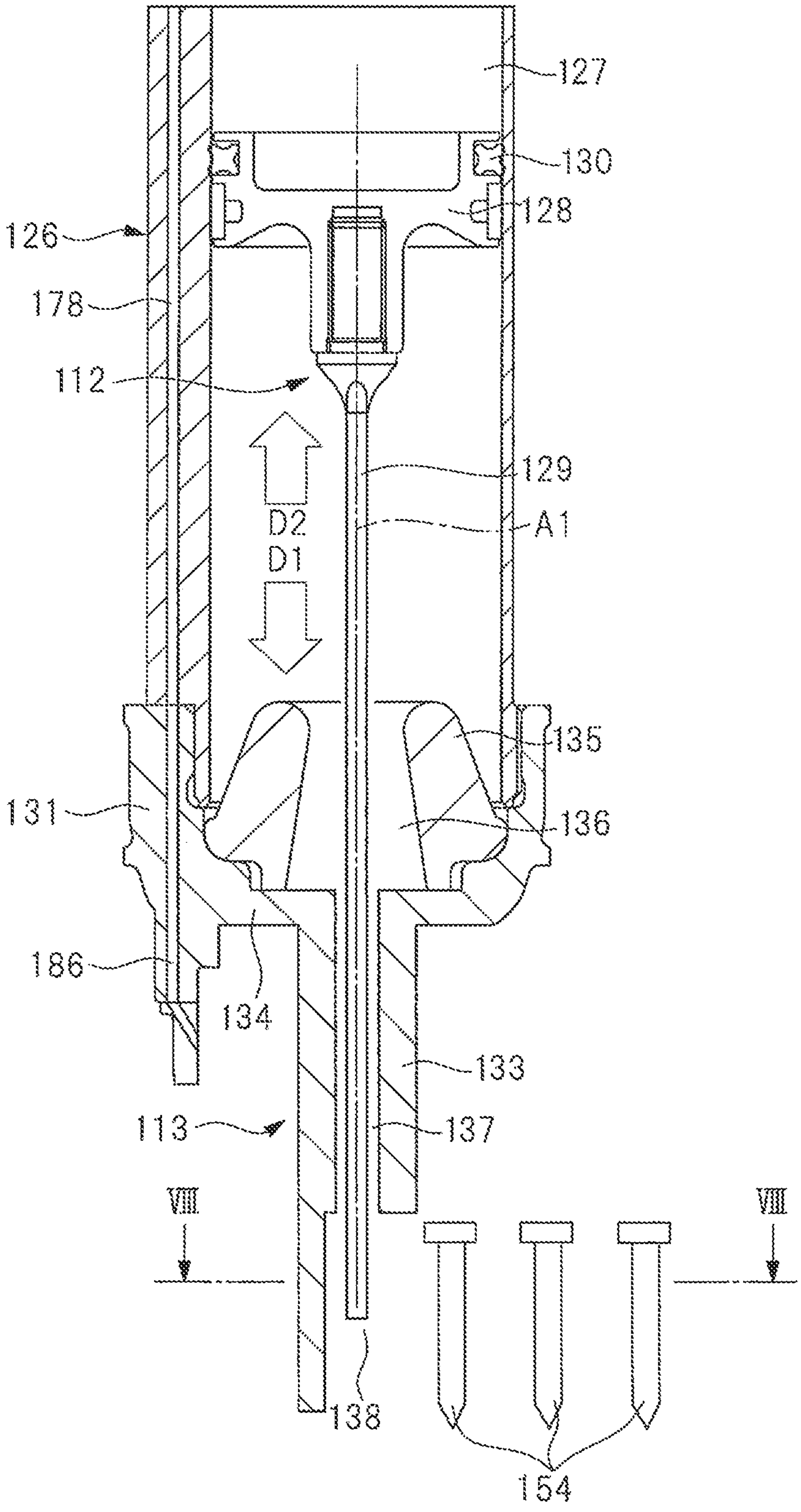
FIG. 17 is a side sectional view of a state in which a striking portion of the driving device according to the third embodiment is at a standby position.

The striking portion 112 is arranged from an inside toward an outside of the housing 111. The striking portion 112 has a piston 128 and a driver blade 129. The piston 128 is reciprocable in the cylinder 126 in a direction along a virtual line A1. The virtual line A1 is a straight line located at a center of the cylinder 126. As shown in FIG. 17, a seal member 130 is attached to an outer peripheral surface of the piston 128. The outer peripheral surface of the seal member 130 contacts with an inner peripheral surface of the cylinder 126 to form a seal surface.

The driver blade 129 is made of metal. The piston 128 and the driver blade 129 are provided as separate members, and the piston 128 and the driver blade 129 are connected to each other. The striking portion 112 is operable in the direction along the virtual line A1. The striking portion 112 is energized in a first direction D1 by pressure of the accumulator chamber 127. The first direction D1 is a direction along the virtual line A1.

Figure 18:
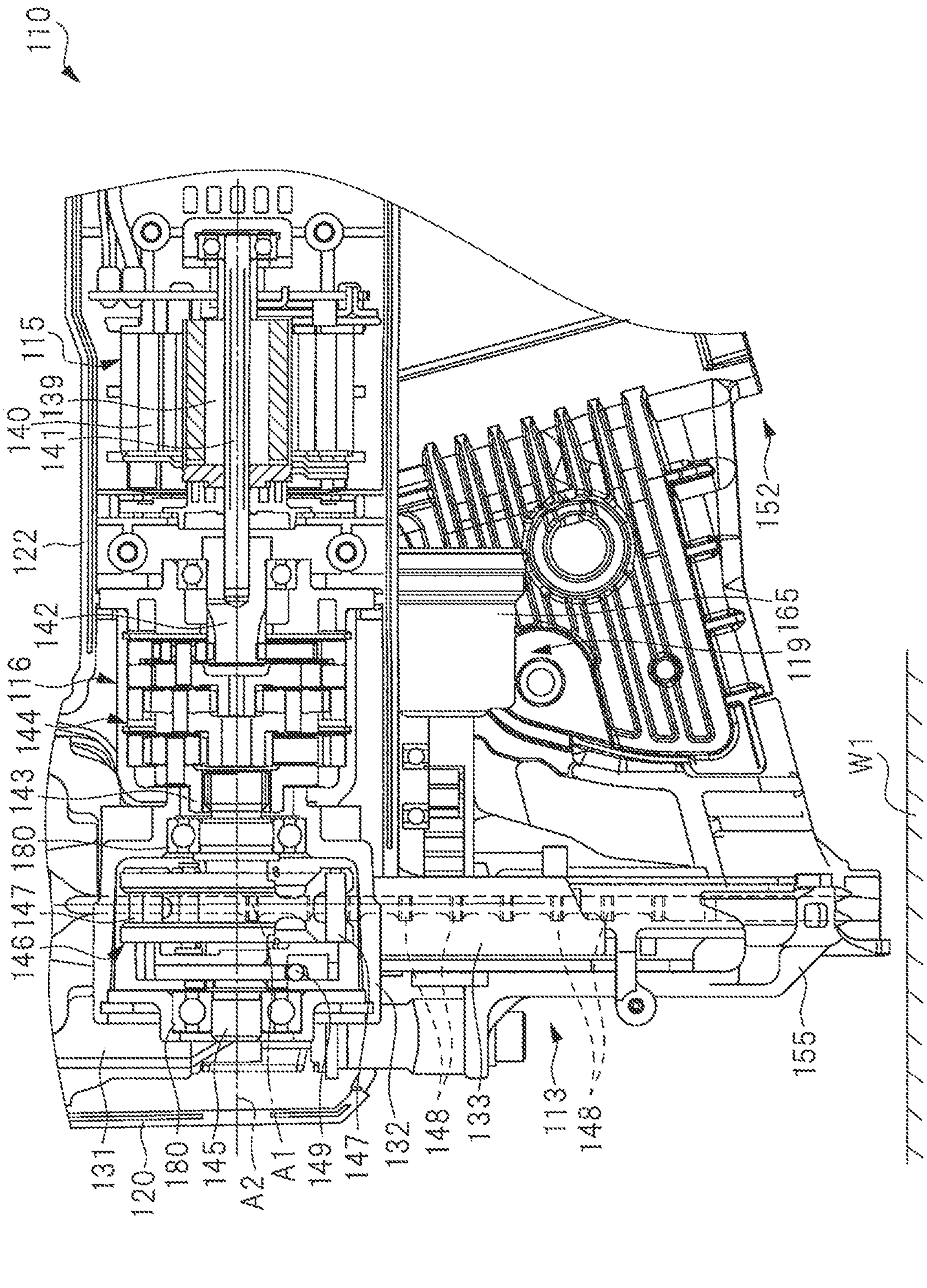
FIG. 18 is a side sectional view showing an internal structure of a motor case that the driving device according to the third embodiment has.

The nose portion 113 is through arranged inside and outside the cylinder case 120. As shown in FIG. 18, the nose portion 113 has a bumper support portion 131, a wheel case 132, and an injection portion 133. The bumper support portion 131 has a cylindrical shape, and the bumper support portion 131 has a load receiving portion 134 as shown in FIG. 17. The bumper 135 is provided in the bumper support portion 131. The bumper 135 may be made of synthetic rubber or silicon rubber. The bumper 135 is annular and the bumper 135 has a guide hole 136. The guide hole 136 is provided around the virtual line A1.

The wheel case 132 has a cylindrical shape, and the wheel case 132 connects to the bumper support portion 131. The injection portion 133 connects to the load receiving portion 134, and the injection portion 133 has an injection path 137. The injection path 137 connects to the guide hole 136. The injection path 137 is a space or a passage provided in the direction along the virtual line A1. Further, the injection portion 133 has a striking region 138. The striking region 138 is a space or passage that connects to the injection path 137.

The driver blade 129 is operable in the direction along the virtual line A1 in the injection path 137 and the striking region 138. The injection portion 133 is a guide that suppresses the movement of the driver blade 129 in a direction intersecting with the virtual line A1.

The electric motor 115 is arranged in the motor case 122 as shown in FIG. 18. The electric motor 115 has a rotor 139 and a stator 140. The stator 140 is attached to the motor case 122. The rotor 139 is attached to a rotor shaft 141. The electric motor 115 is, for example, a brushless motor, and the rotor 139 can rotate forward and backward.

The speed reduction mechanism 116 is provided in the motor case 122. The speed reduction mechanism 116 includes an input element 142, an output element 143, and a plurality of sets of planetary gear mechanisms 144. The input element 142 is coupled to the rotor shaft 141. The rotational force of the electric motor 115 is transmitted to the output element 143 via the input element 142 of the reduction mechanism 116.

The conversion portion 117 is provided in the wheel case 132. The conversion portion 117 converts a rotational force of the output element 143 into an operating force of the striking portion 112. The conversion portion 117 has a rotating shaft 145 and a pin wheel 146. The rotating shaft 145 is connected to the output element 143. The rotating shaft 145 is rotatably supported by a bearing 180. The rotor shaft 141 of the electric motor 115, the input element 142 and the output element 143 of the speed reduction mechanism 116, and the rotating shaft 145 are arranged concentrically with a virtual line A2 as a center. The virtual line A2 is a straight line passing through a center of the rotor shaft 141. The virtual line A1 and the virtual line A2 intersect in a side view of the driving device 110. The pin wheel 146 is fixed to the rotating shaft 145, and a plurality of pins 147 are provided on the pin wheel 146 at intervals in a rotation direction of the pin wheel 146.

The driver blade 129 has a plurality of protrusions 148. The plurality of protrusions 148 are provided at intervals in an operating direction of the striking portion 112. Each pin 147 can independently be engaged with and disengaged from each protrusion 148. The pins 147 and protrusions 148 form a rack and pinion mechanism.

The striking portion 112 is always energized in the first direction D1 by the pressure of the accumulator chamber 127. When the rotational force of the electric motor 115 is transmitted to the pin wheel 146 and the pin 147 is engaged with the protrusion 148, the striking portion 112 is operated in the second direction D2 against the pressure of the accumulator chamber 127. The second direction D2 is a direction along the virtual line A1. The first direction D1 and the second direction D2 are opposite directions. When all the pins 147 are released from the protrusions 148, the rotational force of the pin wheel 146 is not transmitted to the striking portion 112. It is defined as descent that the striking portion 112 is operated in the first direction D1 by the pressure of the accumulator chamber 127. It is defined as rise that the striking portion 112 is operated in the second direction D2 in FIG. 16.

A rotation prevention mechanism 149 is provided in the wheel case 132. The rotation prevention mechanism 149 enables "the rotating shaft 145 is rotated by the rotational force of the electric motor 115". The rotation prevention mechanism 149 prevents "a force of the striking portion 112 in the first direction D1 is transmitted to the pin wheel 146 to rotate the rotating shaft 145".

As shown in FIG. 16, a trigger 150 and a trigger switch 151 are provided on the handle 121. The trigger switch 151 detects presence or absence of an operating force applied to the trigger 150, and outputs a signal according to a detection result.

The power supply unit 114 has an accommodating case and a plurality of battery cells housed in the accommodating case. The battery cell is a secondary battery that can be charged and discharged, and a known battery cell such as a lithium-ion battery, a nickel hydrogen battery, a lithium-ion polymer battery, or a nickel cadmium battery can be arbitrarily used as the battery cell.

Figure 19:
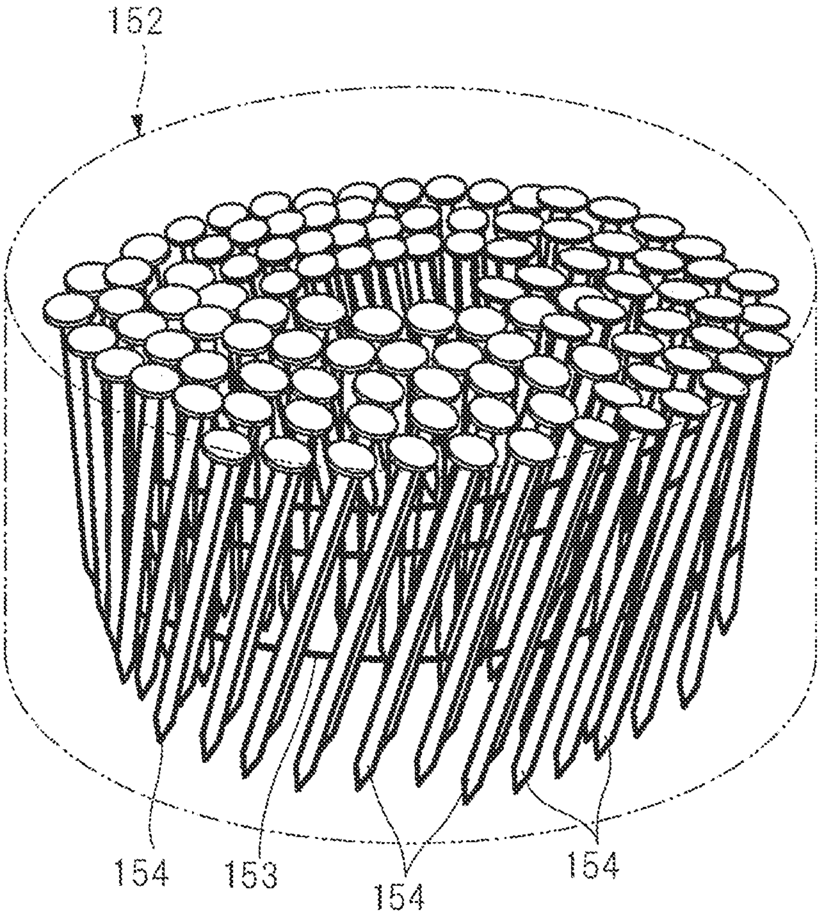
FIG. 19 is a schematic view showing an accommodating state of fasters in a magazine of the driving device according to the third embodiment.

Further, as shown in FIG. 16, a magazine 152 is provided, and the magazine 152 is supported by an injection portion 133 and a mounting portion 123. The magazine 152 is, as an example, made of a synthetic resin and has a cylindrical casing. As shown in FIG. 19, the magazine 152 can accommodate a plurality of nails 154, which are connected to each other by a wire 153, in the casing in a rolled state. The nail 154 is, for example, made of metal and has a shaft shape. Furthermore, the supply mechanism 119 is provided between the injection portion 133 and the casing of the magazine 152. The supply mechanism 119 sends the nail 154 in the magazine 152 to the injection portion 133. A push lever 155 is attached to the injection portion 133. The push lever 155 is operatable within a predetermined range in the direction along the virtual line A1 with respect to the injection portion 133.

Figure 20:
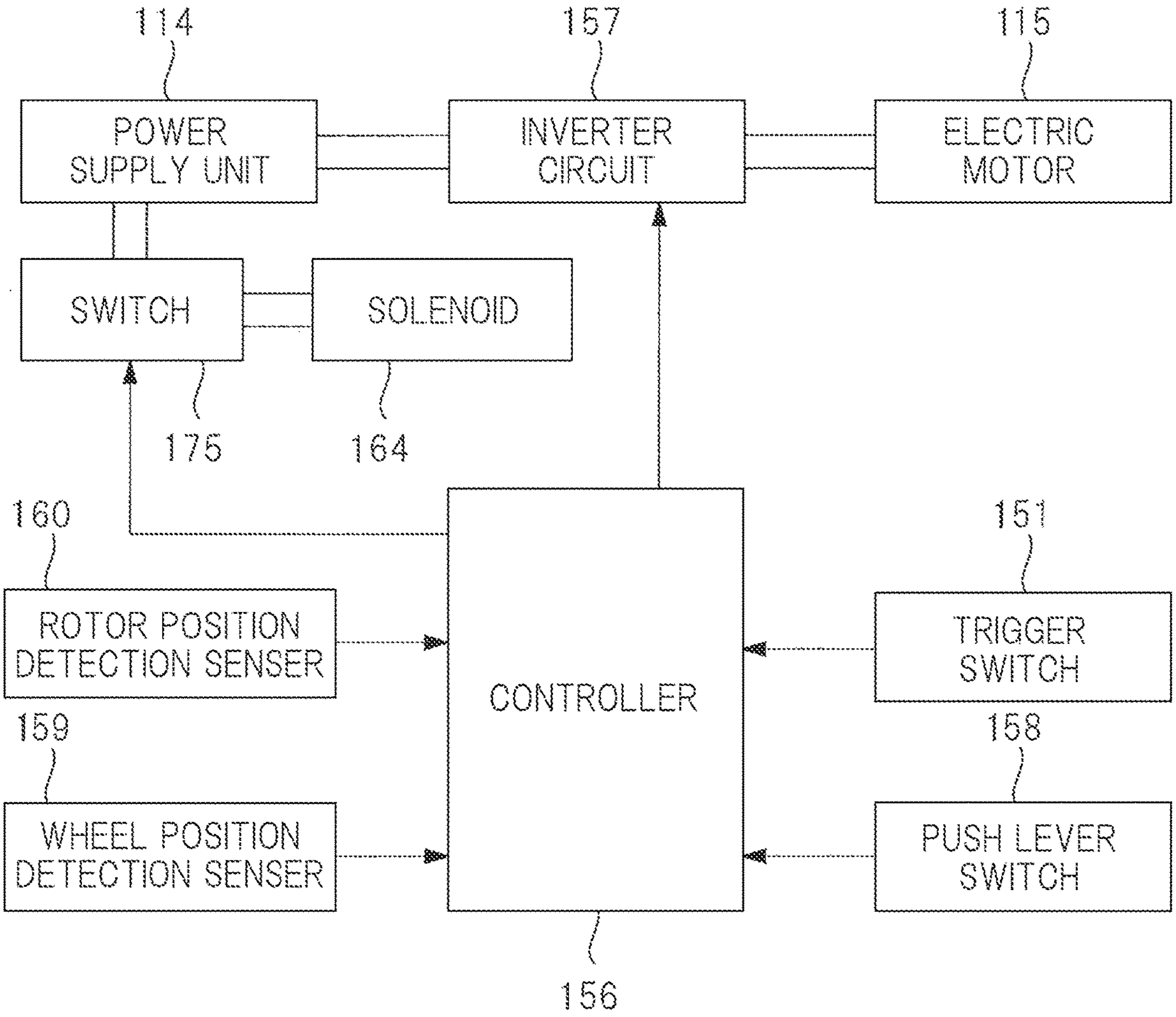
FIG. 20 is a block diagram showing a control system of the driving device according to the third embodiment.

The control circuit 156 shown in FIG. 20 is provided through in the mounting portion 123 and the motor case 122. The control circuit 156 is a microcomputer having an input/output interface, a control circuit, an arithmetic processing unit, and a storage unit. Further, an inverter circuit 157 is provided in the motor case 122. The inverter circuit 157 connects and disconnects the stator 140 of the electric motor 115 to and from the power supply unit 114. The inverter circuit 157 includes a plurality of switching elements, and the plurality of switching elements can be turned on/off independently.

Further, a push lever switch 158, a wheel position detection sensor 159, and a rotor position detection sensor 160 dare provided in the housing 111. The push lever switch 158 detects whether the push lever 155 is pressed against a workpiece W1, and outputs a signal. The workpiece W1 may be any of floor, wall, ceiling and the like. The wheel position detection sensor 159 detects a position of the pin wheel 146 in a rotation direction, and outputs a signal. The rotor position detection sensor 160 detects a position of the rotor 139 in the rotation direction, and outputs a signal.

The signal of the push lever switch 158, the signal of the trigger switch 151, the signal of the wheel position detection sensor 159, and the signal of the rotor position detection sensor 160 are inputted to the control circuit 156. The control circuit 156 processes the signal of the wheel position detection sensor 159 to estimate a position of the striking portion 112 in the direction along the virtual line A1. The control circuit 156 controls the inverter circuit 157, thereby controlling rotation and stop of the electric motor 115, a rotation speed of the electric motor 115, and the rotation direction of the electric motor 115.

Next, an example of using the driving device 110 will be described. When the control circuit 156 detects at least one of no application of an operating force to the trigger 150 or no press of the push lever 155 against the workpiece W1, the control circuit 156 controls the inverter circuit 157 to stop the supply of the power to the electric motor 15. When the electric motor 115 is stopped, the striking portion 112 is stopped at the standby position. Here, as shown in FIG. 17, an intermediate position of the striking portion 112 at which the piston 128 is separated from the bumper 135 will be described as an example of the standby position of the striking portion 112.

The pressure in the accumulator chamber 127 is always applied to the striking portion 112. However, the striking portion 112 is stopped at the standby position by the following action. Any pin 147 is engaged with the protrusion 148, and an energizing force received by the striking portion 112 from the accumulator chamber 127 is transmitted to the pin wheel 146. The rotation prevention mechanism 149 prevents the rotation of the rotating shaft 145, and the striking portion 112 is stopped at the standby position.

When the control circuit 156 detects that the operating force is applied to the trigger 150 and that the push lever 155 is pressed against the workpiece W1, it controls the inverter circuit 157 to supply the power of the power supply unit 114 to the electric motor 115. When the electric motor 115 is rotated, the rotational force of the electric motor 115 is transmitted to the rotating shaft 145 via the speed reduction mechanism 116. As such, the pin wheel 146 rotates, and the striking portion 112 rises against the pressure of the accumulator chamber 127. Therefore, the pressure in the accumulator chamber 127 rises.

Figure 21:
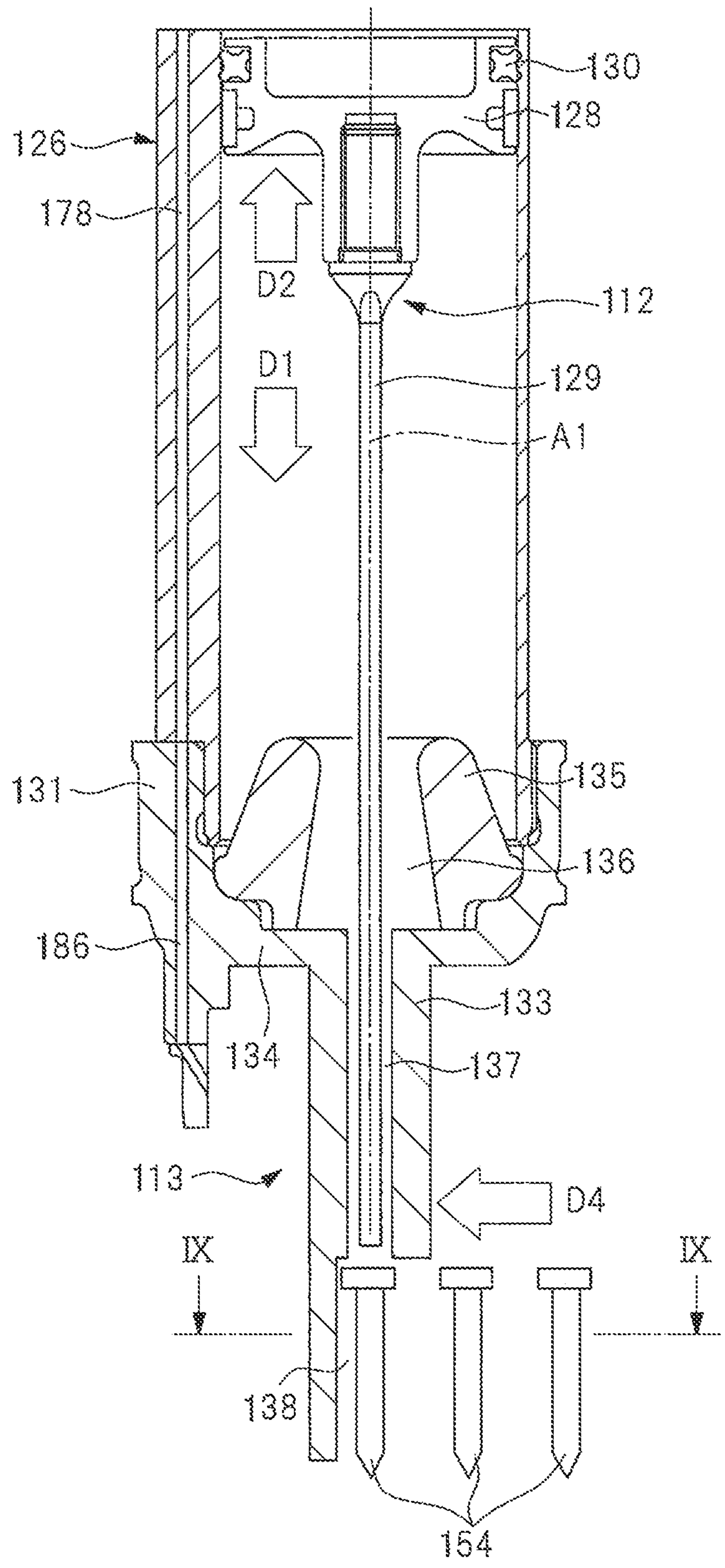
FIG. 21 is a side sectional view of a state in which the striking portion of the driving device according to the third embodiment is at a top dead center.

When the striking portion 112 reaches a top dead center as shown in FIG. 21, all the pins 147 are released from the protrusions 148. As such, the striking portion 112 descends due to the pressure of the accumulator chamber 127. When the striking portion 112 descends, the pressure in the accumulator chamber 127 is lowered. When the striking portion 112 descends, the driver blade 129 hits one nail 154 that has been sent to the striking region 138. The hit nail 154 is driven into the workpiece W1.

Figure 22:
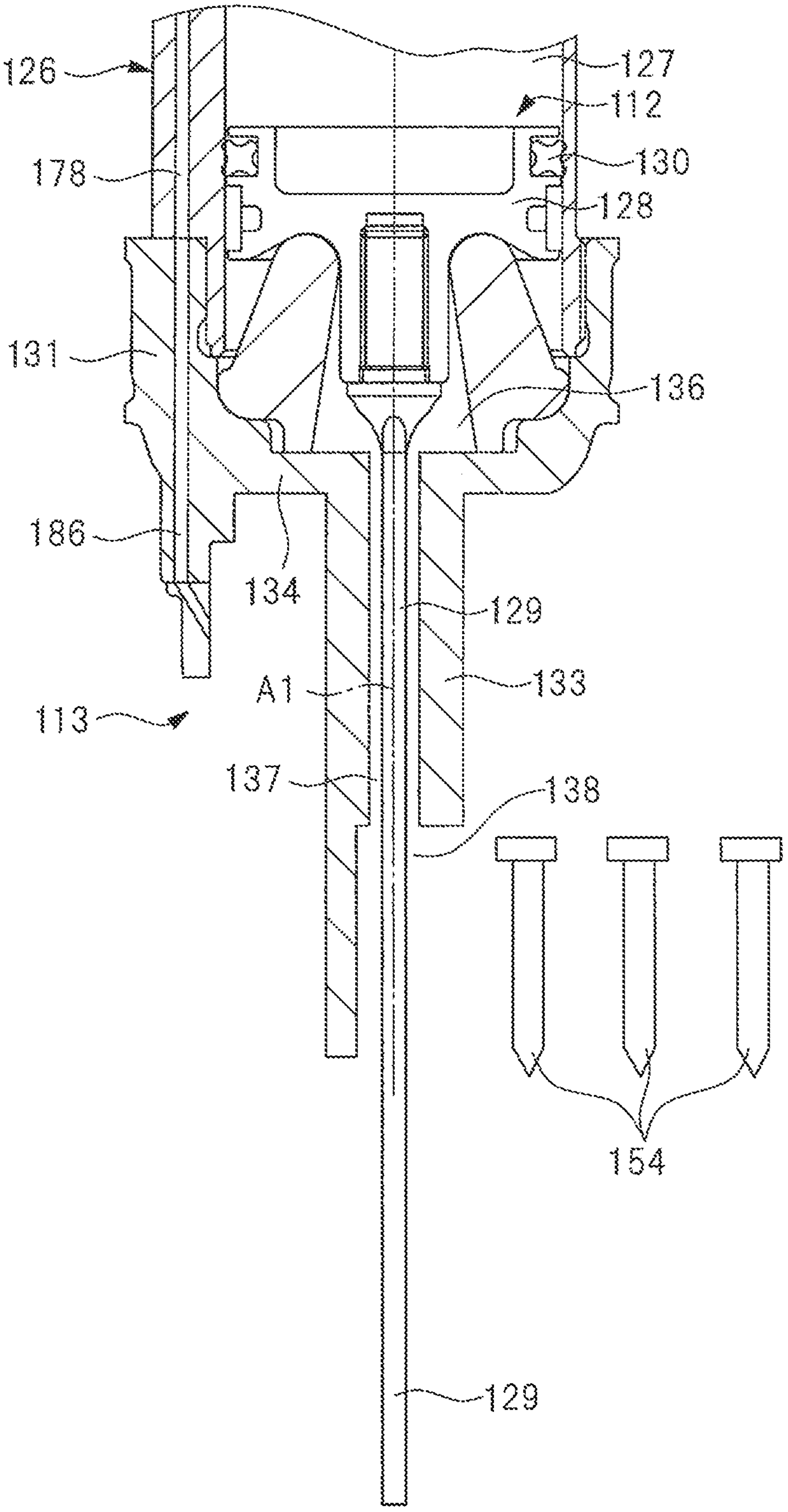
FIG. 22 is a side sectional view of a state in which the striking portion of the driving device according to the third embodiment is at a bottom dead center.

Further, the piston 128 collides with the bumper 135 as shown in FIG. 22 after the nail 154 is driven into the workpiece W1. The bumper 135 is elastically deformed by receiving a load, and the bumper 135 absorbs a part of kinetic energy of the striking portion 112. A state in which the piston 128 collides with the bumper is a bottom dead center of the striking portion 112.

When the driver blade 129 drives the nail 154 into the workpiece W1, the push lever 155 is separated from the workpiece W1 due to recoil of the striking. However, the control circuit 156 continues the rotation of the electric motor 115. Therefore, the pin 147 is engaged with the protrusion 148, and the striking portion 112 is raised from the bottom dead center. The control circuit 156 processes the signal of the wheel position detection sensor 159 to detect the position of the striking portion 112 in the direction of the virtual line A1. The control circuit 156 stops the electric motor 115 when the striking portion 112 reaches the standby position.

Figure 23:
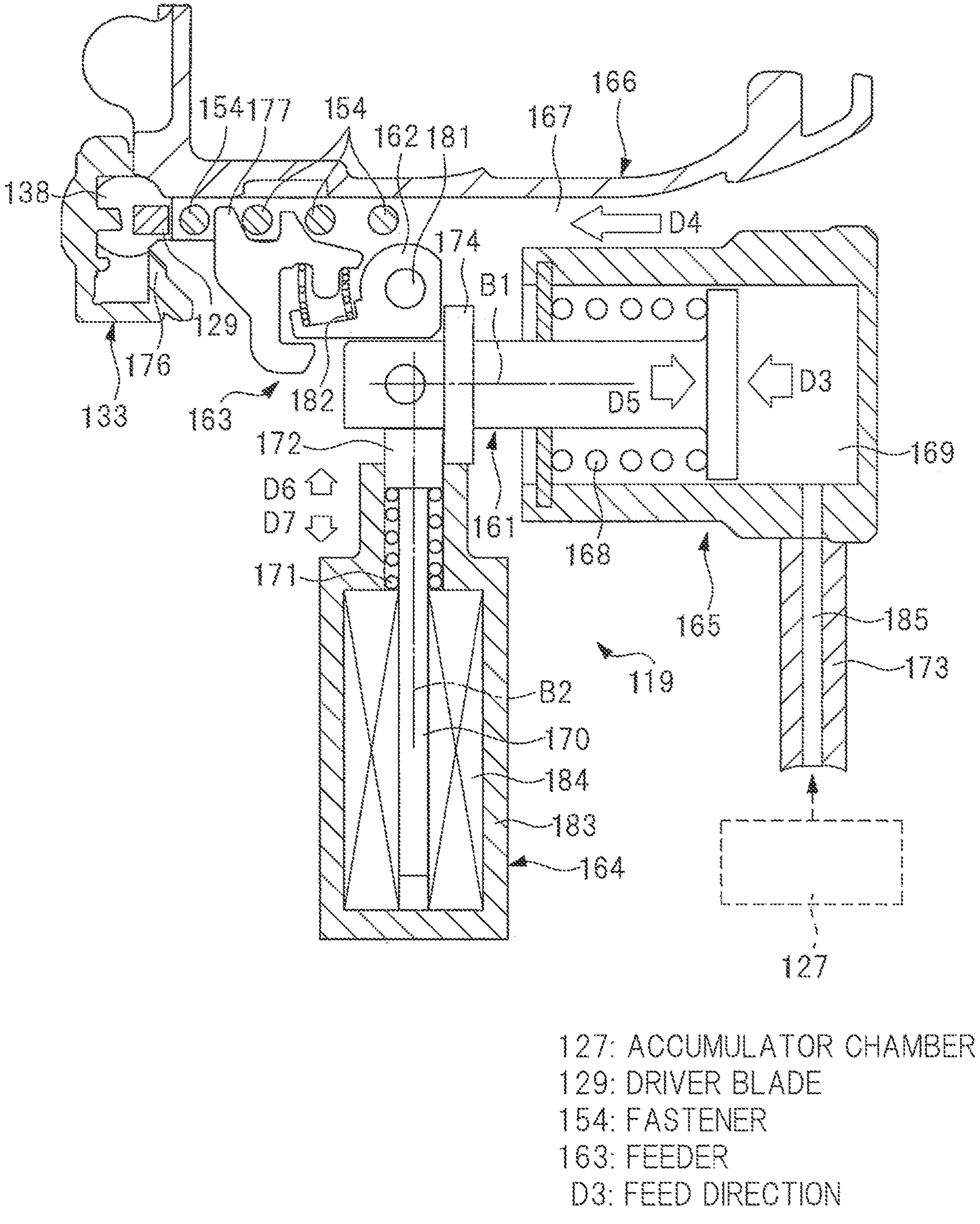
FIG. 23 is a view showing a state in which a feed piston is stopped at an initial position in a plane cross-section taken along line VIII-VIII of FIG. 17.

A configuration and an operation of the supply mechanism 119 will be described. The supply mechanism 119 includes a feed piston 161, a feeder arm 162, a feeder 163, and a solenoid 164 shown in FIG. 23. Further, a cylindrical holder 165 is fixed to the motor case 122 or the magazine 152. The feed piston 161 can reciprocate with respect to the holder 165. In FIG. 23 which is a plane cross-section perpendicular to the virtual line A1, a virtual line B1 is a straight line representing an operating direction of the feed piston 161. The feed piston 161 has a flange 174. The flange 174 projects from an outer peripheral surface of the feed piston 161.

Further, the injection portion 133 has a stopper 176 and an openable/closable injection portion cover 166. The injection portion cover 166 forms a supply path 167 for the nail 154. The supply path 167 connects an inside of the magazine 152 and the striking region 138. The nail 154 is sent in the supply path 167 along a feed direction D4. A spring 168 is provided in the holder 165. An auxiliary accumulator chamber 169 is provided in the holder 165. The auxiliary accumulator chamber 169 is a space into which air flows. The auxiliary accumulator chamber 169 connects to the accumulator chamber 127 via passages 185, 186, and 178. A passage forming member 173 is attached to the injection portion 133, and the passage 185 is provided in the passage forming member 173. The passage 186 is provided in a bumper support portion 131, and the passage 178 is provided in the cylinder 126. The passage 178 penetrates the cylinder 126 in the direction along the virtual line A1.

The feed piston 161 is energized by pressure of the auxiliary accumulator chamber 169 in a feed direction D3 shown in FIG. 23. The feed directions D3, D4 are both directions along the virtual line B1. The feed piston 161 is energized by the energizing force of the spring 168 in a return direction D5 separated from the injection portion 133. The feed direction D3 and the return direction D5 are opposite to each other.

The feeder arm 162 is fixed to the feed piston 161. The feeder 163 is operable within a predetermined angle around the support shaft 181 of the feeder arm 162. The feeder 163 has a feed claw(s) 177. A spring 182 is provided between the feeder arm 162 and the feeder 163. The spring 182 energizes the feeder 163 clockwise in FIG. 23.

The solenoid 164 has a bobbin 183, a coil 184, a plunger 170 and a spring 171. The coil 184 is provided in the bobbin 183, and the plunger 170 can reciprocate with respect to the bobbin 183. A virtual line B2 is a straight line representing an operating direction of the plunger 170. The plunger 170 is made of a magnetic material, for example, iron. In FIG. 23, the virtual line B1 and the virtual line B2 are arranged so as to intersect at approximately 90 degrees. The stopper 172 is fixed to the plunger 170, and the spring 171 energizes the plunger 170 in a forward direction D6 of approaching the feed piston 161. The coil 184 is connected to the power supply unit 114 via the switch 175 shown in FIG. 20. The control circuit 156 turns the switch 175 on and off.

Figure 25:
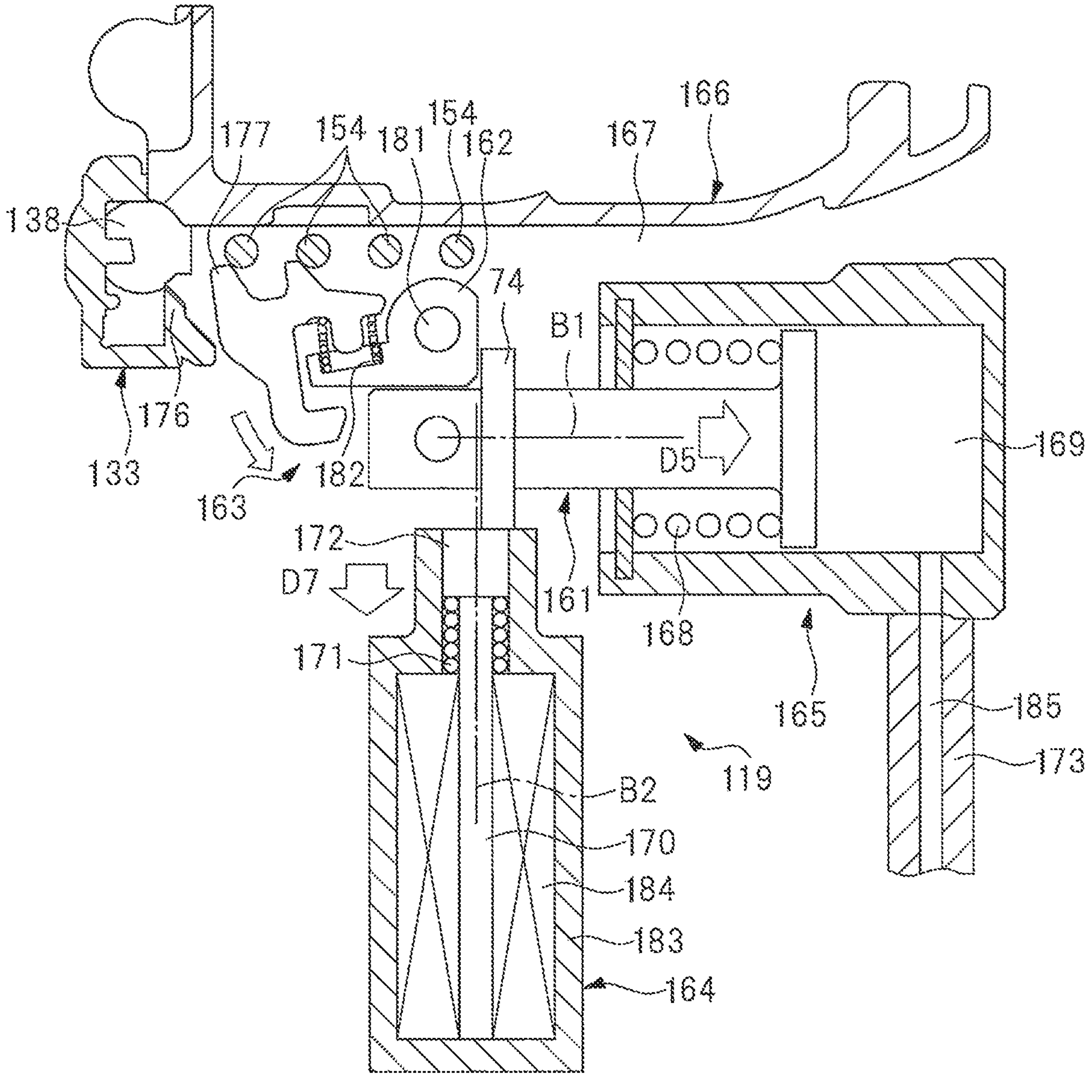
FIG. 25 is a view showing a state in which the feed piston of FIG. 24 operates and a feed claw of a feeder has run on a nail.

When the switch 175 is turned on, a current of the power supply unit 114 flows to the coil 184 and the coil 184 generates a magnetic attraction force. As such, as shown in FIG. 25, the plunger 170 operates in a retreating direction D7 separated from the feed piston 161 against the force of the spring 171. When the switch 175 is turned off, the current of the power supply unit 114 does not flow to the coil 184. The coil 184 cancels the magnetic attraction force, and the plunger 170 operates in a forward direction D6 due to the force of the spring 171.

Next, the operation of the supply mechanism 119 will be described. From a time point when the striking portion 112 rises and a tip of the driver blade 129 moves out of the striking region 138, one nail 154 is sent to the striking region 138 from the supply path 167 while the striking portion 112 reaches the top dead center shown in FIG. 21.

When the striking portion 112 is stopped at the standby position shown in FIG. 17, a part of the driver blade 129 is located within the striking region 138. Further, the control circuit 156 stops the supply of the current to the solenoid 164. Therefore, the plunger 170 energized by the spring 171 in the forward direction D6 is stopped at a position where the stopper 172 contacts with the feed piston 161 as shown in FIG. 23, that is, at a forward position. Furthermore, in FIG. 23, an energizing force in the feed direction D3 that the feed piston 161 receives under the pressure of the auxiliary accumulator chamber 169 exceeds an energizing force in the return direction D5 that is received from the spring 168. Therefore, the feed piston 161 is stopped at a position where the flange 174 contacts with the stopper 172, that is, at an initial position.

When the feed piston 161 is stopped at the initial position, the feeder 163 is stopped at a position away from the stopper 176. The feed claw 177 of the feeder 163 is located between a first nail 154 and a second nail 154 in the feed direction D4. The first nail 154 in the feed direction D4 is located in the supply path 167, and the nail 154 does not exist in the striking region 138.

Figure 24:
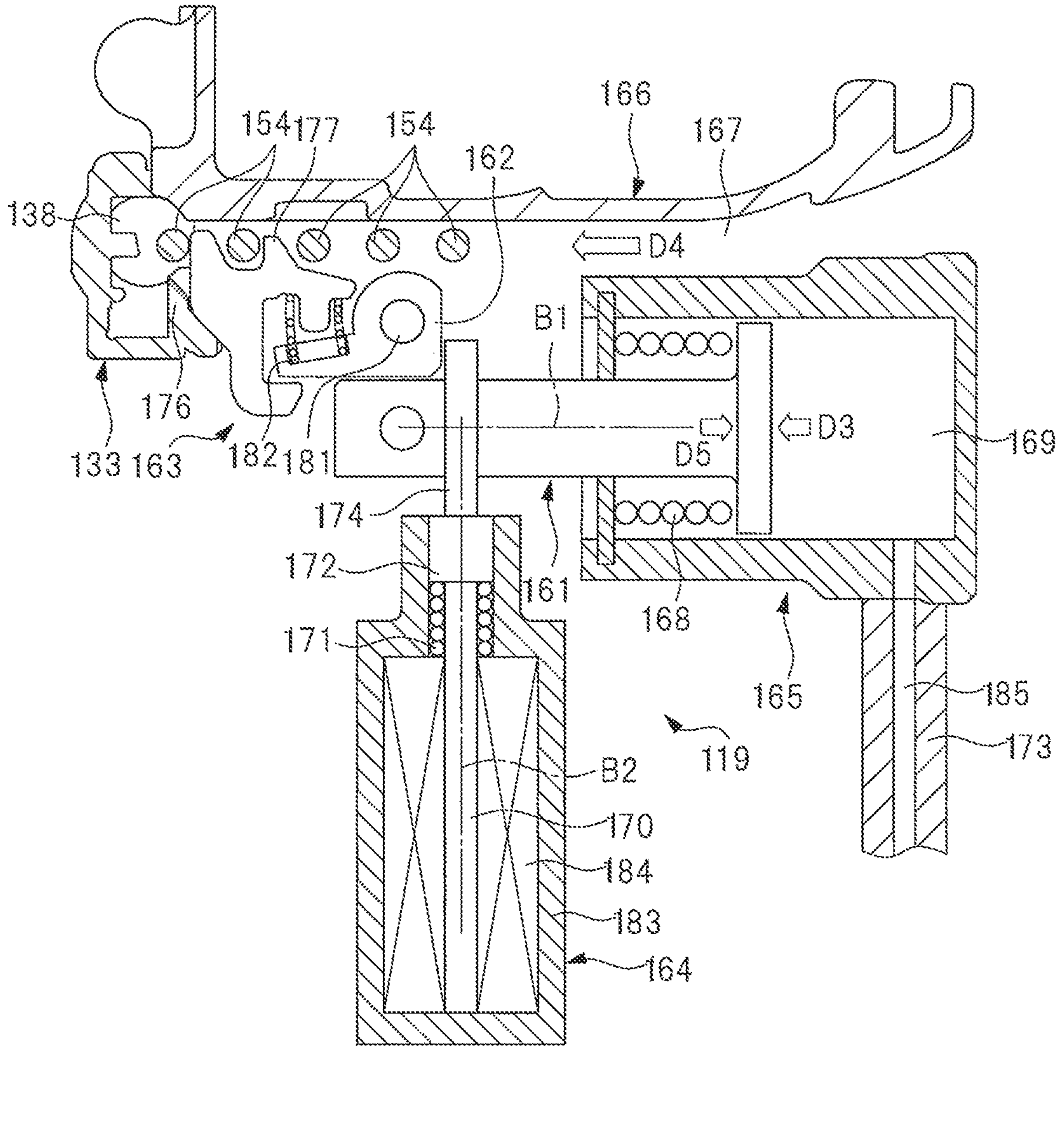
FIG. 24 is a view showing a state in which the feed piston is actuated from the initial position to an operating position in a plane cross-section taken along line IX-IX of FIG. 21.

When the striking portion 112 operates in the second direction D2, the pressure in the accumulator chamber 127 and the pressure in the auxiliary accumulator chamber 169 rise. Therefore, the energizing force in the feed direction D3 that the feed piston 161 receives increases. The control circuit 156 causes the solenoid 164 to supply a current when the striking portion 112 is raised from the standby position. As such, the plunger 170 operates in the retreating direction D7 against the energizing force of the spring 171 and the plunger 170 stops at a position of contacting with the bobbin 183, that is, at a retreating position as shown in FIG. 24. As such, the stopper 172 is released from the flange 174, and the feed piston 161 operates in the feed direction D3. Therefore, one nail 154 pushed by the feed claw 177 is sent from the supply path 167 to the striking region 138. The feed piston 161 is stopped in a state where the feeder 163 contacts with the stopper 176, that is, at an operating position.

In this way, the feed piston 161 is stopped at the operating position before the striking portion 112 reaches the top dead center. When the feed piston 161 is stopped at the operating position, the flange 174 is located in front of the stopper 172. The control circuit 156 stops the supply of the current to the solenoid 164 before the striking portion 112 reaches the top dead center. The plunger 170 is energized by the spring 171 in the forward direction D6, but the stopper 172 contacts with the flange 174. Therefore, the plunger 170 is stopped at the retreating position shown in FIG. 24.

When the striking portion 112 reaches the top dead center as shown in FIG. 21 and the striking portion 112 is descended from the top dead center toward the bottom dead center, the pressure of the accumulator chamber 127 and the pressure of the auxiliary accumulator chamber 169 are lowered. Then, when the energizing force in the return direction D5 that is applied to the feed piston 161 exceeds the energizing force in the feed direction D3, the feed piston 161 operates in the return direction D5 as shown in FIG. 25. When the feed piston 161 operates, the flange 174 and the stopper 172 are rubbed against each other. Further, the feeder 163 is separated from the stopper 176. Furthermore, as shown in FIG. 25, the feeder 163 operates counterclockwise around the support shaft 181 due to a reaction force of the feed claw 177 pressed against the nail 154, and the feed claw 177 runs on the nail 154.

Figure 26:
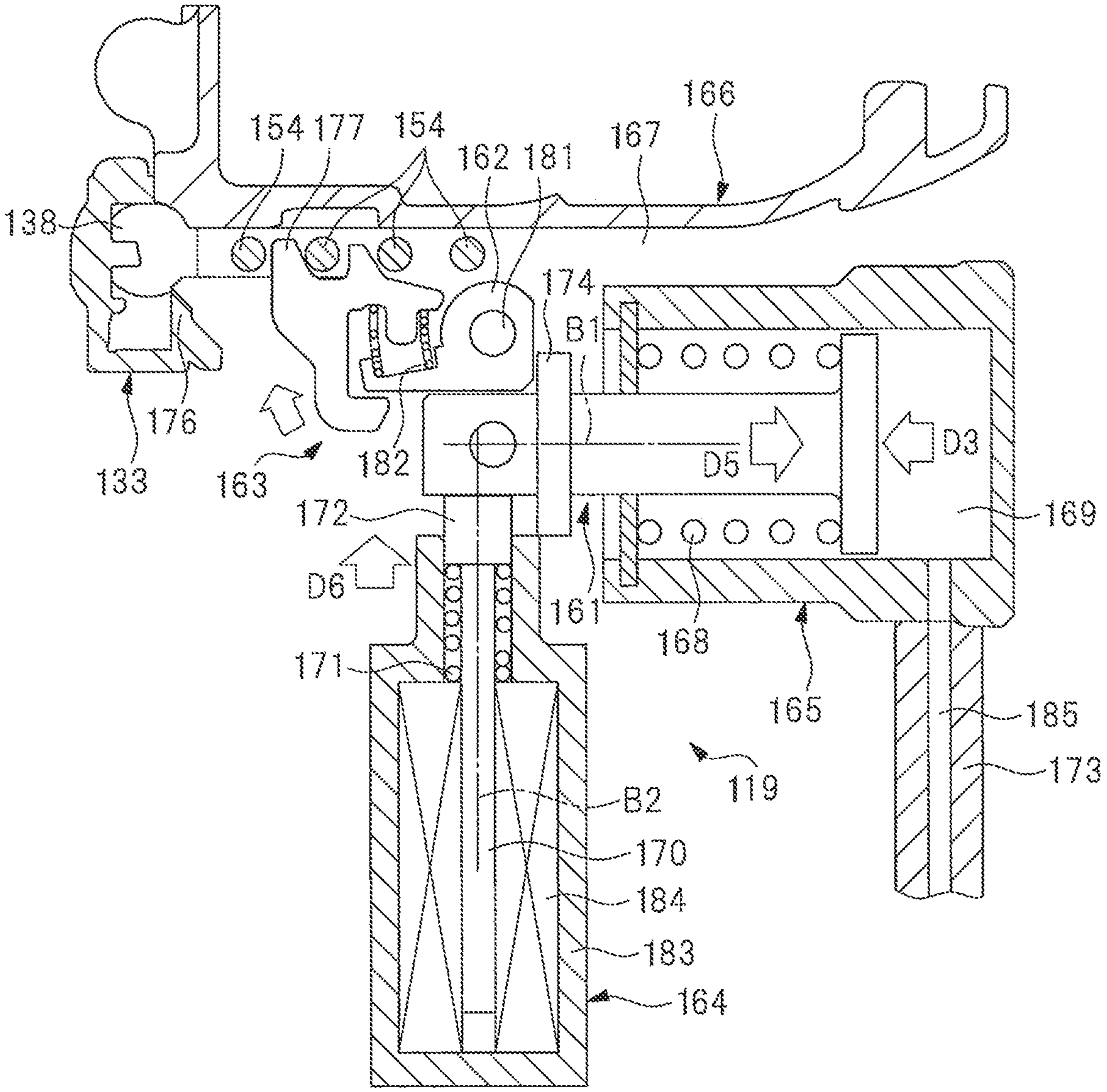
FIG. 26 is a view showing a state in which the feed piston of FIG. 25 operates and the feed claw of the feeder has got over the nail.

Then, when the feed claw 177 gets over the nail 154, the feeder 163 operates clockwise around the support shaft 181 due to the energizing force of the spring 182 and is stopped. Therefore, as shown in FIG. 26, the feed claw 177 enters between the first nail 154 and the second nail 154 in the feed direction D4. Further, when the flange 174 moves from a front of the stopper 172, the plunger 170 operates in a forward direction D6. When the stopper 172 contacts with the feed piston 161, the plunger 170 is stopped at a forward position. Furthermore, when the energizing force in the return direction D5 and the energizing force in the feed direction D3 that are applied to the feed piston 161 become substantially the same, the feed piston 161 is stopped at a provisional position.

When the striking portion 112 is ascended from the bottom dead center after the striking portion 112 reaches the bottom dead center, the pressure in the accumulator chamber 127 and the pressure in the auxiliary accumulator chamber 169 increase. As such, the feed piston 161 operates in the feed direction D3. Then, as shown in FIG. 23, when the flange 174 contacts with the stopper 172, the feed piston 161 is stopped at the initial position.

Figure 27:
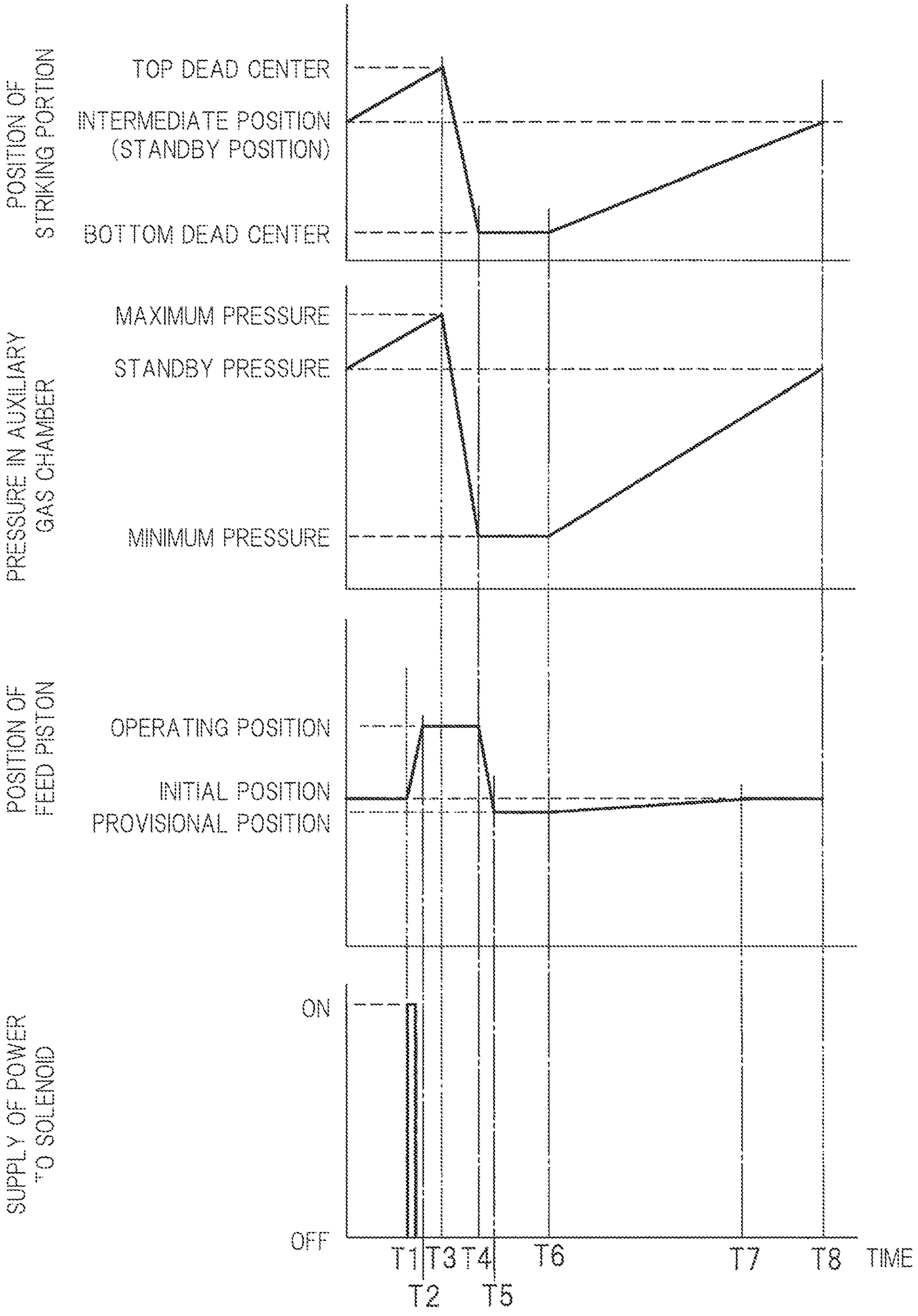
FIG. 27 is a time chart showing an operating state of the driving device.

An example of a time chart showing a state of the driving device 110 is shown in FIG. 27. In supplying the power to the solenoid 164, "ON" means that the control circuit 156 supplies the power to the solenoid 164, and "OFF" means that the control circuit 156 stops supplying the power to the solenoid 164.

The striking portion 112 is stopped at the standby position before time T1, and the pressure in the auxiliary accumulator chamber 169 is standby pressure. Further, the feed piston 161 is stopped at the initial position as shown in FIG. 23. Furthermore, the supply of the power to the solenoid 164 is OFF.

When the striking portion 112 is operated from the standby position toward the top dead center, the pressure in the auxiliary accumulator chamber 169 is increased. At time T1 before the striking portion 112 reaches the top dead center, the supply of the power to the solenoid 164 is switched from OFF to ON. As such, the feed piston 161 is operated from the initial position. Prior to time T2, the supply of the power to the solenoid 164 is switched from ON to OFF. However, as shown in FIG. 24, since the stopper 172 contacts with the flange 174, the plunger 170 is stopped at the retreating position.

The feed piston 161 reaches the operating position at time T2 and is stopped at the operating position. When the striking portion 112 reaches the top dead center at time T3, the pressure in the auxiliary accumulator chamber 169 becomes the maximum pressure. When the striking portion 112 is operated from the top dead center toward the bottom dead center, the pressure in the auxiliary accumulator chamber 169 is reduced. The feed piston 161 is stopped at the operating position while the striking portion 112 is operated from the top dead center toward the bottom dead center.

When the striking portion 112 reaches the bottom dead center at time T4, the pressure in the auxiliary accumulator chamber 169 becomes the minimum pressure. Further, the feed piston 161 is operated from the operating position toward the initial position as shown in FIG. 25 after the time T4. When the feed piston 161 passes through the initial position and the energizing force in the return direction D5 and the energizing force in the feed direction D3 become substantially the same, the feed piston 161 is stopped at a provisional position shown in FIG. 26 at time T5. When the striking portion 112 operates from the bottom dead center toward the top dead center after time T6, the pressure in the auxiliary accumulator chamber 169 is increased and the feed piston 161 operates from the provisional position toward the initial position. When the flange 174 contacts with the stopper 172, the feed piston 161 is stopped at the initial position at time T7. The striking portion 112 reaches the standby position at time T8 and is stopped, and the pressure in the auxiliary accumulator chamber 169 becomes the standby pressure.

In the driving device 110 of the present embodiment, the electric motor 115 is rotated by the power of the power supply unit 114, the striking portion 112 is operated in the second direction D2, and the pressure in the accumulator chamber 127 is increased. The striking portion 112 operates in the first direction D1 due to the pressure of the accumulator chamber 127, and the driver blade 129 hits the nail 154. The pressure in the accumulator chamber 127 is transmitted to the auxiliary accumulator chamber 169. Then, the feed piston 161, the feeder arm 162, and the feeder 163 in the supply mechanism 119 operate in the feed direction D3 due to the pressure of the auxiliary accumulator chamber 169. That is, when the feed piston 161, the feeder arm 162, and the feeder 163 operate in the feed direction D3, there are no elements to be engaged and disengaged. Therefore, each temperature rise of the feed piston 161, the feeder arm 162, and the feeder 163 can be prevented.

Further, the electric motor 115 operates the striking portion 112 to raise the pressure in the accumulator chamber 127, and the pressure in the accumulator chamber 127 is used as energy for operating the feed piston 161 and the feeder 163. Therefore, an increase in power consumption of the electric motor 115 can be suppressed in order to operate the feed piston 161 and the feeder 163.

Further, the accumulator container 118 and the accumulator chamber 127 also serve as a part of a mechanism for transmitting pressure to the auxiliary accumulator chamber 169. Therefore, an increase in the number of dedicated parts provided for operating the feed piston 161 and the feeder 163 can be suppressed. This makes it possible to avoid complication of a structure of the driving device 110 and to realize miniaturization thereof. Since a motor, a gear, or the like is not used as a supply member for the nail 154, it is possible to suppress the miniaturization of the driving device 110 and an increase in manufacturing costs of the driving device 110.

In addition, the control circuit 156 can control the timing of operating the feed piston 161 and the feeder 163 in the feed direction D3 by controlling the timing of supplying the power from the power supply unit 114 to the solenoid 164. That is, the timing of sending the nail 154 from the supply path 167 to the striking region 138 can be controlled. For example, if required time from a time point when the striking portion 112 starts operating at the standby position to a time point when the power is supplied from the power supply unit 114 to the solenoid 164 is lengthened, required time from the time point when the striking portion 112 starts operating from the standby position to a time point when the nail 154 is sent to the striking region 138 becomes long.

That is, regardless of conditions such as pressure of the accumulator chamber 127 and pressure of the auxiliary accumulator chamber 169, temperature of an environment(s) in which the driving device 110 is used, and individual differences in dimensions of the feed piston 161, it is possible to stabilize the timing of sending the nail 154 from the supply path 167 to the striking region 138. For example, when the striking portion 112 rises from the standby position, it can be reliably avoided that the nail 154 contacts with the tip of the driver blade 129.

Incidentally, the standby position of the striking portion 112 may be the bottom dead center. In this case, the control circuit 156 controls the timing of supplying the power to the solenoid 164 so that the nail 154 is sent from the supply path 167 to the striking region 138 in an interval from a time point when the striking portion 112 rises from the bottom dead center and the tip of the driver blade 129 retracts from the striking region 138 to a time point when the striking portion 112 reaches at the top dead center. That is, the control circuit 156 does not stop the striking portion 112 at an intermediate position thereof.

Further, the driving device 110 may not include the solenoid 164 and the switch 175. In this case, when the energizing force in the return direction D5 that is received from the spring 168 and the energizing force in the feed direction D3 that is received by the pressure of the auxiliary accumulator chamber 169 are substantially the same, the feed piston 161 is stopped at the initial position as shown in FIG. 23. Furthermore, the feed piston 161 operates in the feed direction D3 when the energizing force in the feed direction D3 exceeds the energizing force in the return direction D5. In addition, the feed piston 161 operates in the return direction D5 in which the energizing force in the feed direction D3 is less than the energizing force in the return direction D5. That is, the timing at which the feed piston 161 operates in the feed direction D3 is determined by a strength of the spring 168, for example, a spring constant of the spring 168. As the spring constant of the spring 168 becomes larger, the required time from a time point when the striking portion 112 is operated at the standby position to a time point when the nail 154 is sent to the striking region 138 becomes longer.

An example of each technical meaning of the matters disclosed in the present embodiments is as follows. The driving device 110 is an example of a driving device. The driver blade 129 is an example of a blade. The injection portion 133 is an example of a nose. The nail 154 is an example of a fastener. The feed piston 161, the feeder arm 162, and the feeder 163 are examples of a feeder. The first direction D1 indicating that the striking portion 112 descends is an example of a first direction. The second direction D2 indicating that the striking portion 112 rises is an example of a second direction. The accumulator chamber 127 is an example of a gas chamber.

The electric motor 115 is an example of an electric motor. The feed piston 161, the feeder arm 162, and the feeder 163 are examples of operating members. The flange 174 is an example of a protrusion portion. The feed direction D3 is an example of a third direction. The return direction D5 is an example of a fourth direction. The stopper 172 is an example of a stopper. The position of the stopper 172 in a state where the plunger 170 is stopped at the forward position as shown in FIG. 23 is an example of a first position of a preventing member. The position of the stopper 172 in a state where the plunger 170 is stopped at the retreating position as shown in FIGS. 24 and 25 is an example of a second position of the preventing member. The solenoid 164 is an example of a second actuator. The accumulator chamber 127, the passages 178, 185, 186, the striking portion 127, and the feed piston 161 are an example of an energizing mechanism.

The control circuit 156 is an example of a control circuit. The spring 168 is an example of a first energizing portion. The spring 171 is an example of a second energizing portion. The feed claw 177 is an example of a claw portion. The auxiliary accumulator chamber 169 is an example of an auxiliary gas chamber. The cylinder 126 is an example of a support member. The passage 178 is an example of a passage. The magazine 152 is an example of a magazine. The power supply unit 114 is an example of a power supply unit.

The driving device is not limited to the above-mentioned embodiments, and can be variously changed without departing from the scope thereof. For example, the supply member may be composed of a single element or may be composed of a plurality of elements. Further, the electric motor may be either a brushless motor or a brushed motor. The power supply unit that supplies the power to the electric motor may be either a DC power supply or an AC power supply. The DC power source may be either a secondary battery or a primary battery. The AC power supply is not provided in the mounting portion, but the mounting portion and the AC power supply are connected by a power cable. The first energizing portion and the second energizing portion may each be made of synthetic rubber instead of a metal spring. The fastener may be a shaft-shaped nail, an arch-shaped staple, or a stud.

Further, the actuator that operates the preventing member may be an electric servomotor instead of the solenoid. The electric servomotor and the preventing member are connected by a rack and pinion mechanism. When the power is supplied from the power supply unit to the electric servomotor, the electric servomotor is rotated and the preventing member is operated from the first position to the second position. When the supply of the power to the electric servomotor is stopped, the preventing member operates from the second position to the first position due to a force of the second energizing portion and stops.

EXPLANATION OF SYMBOLS 1A to 1D . . . Driving device; 10 . . . Housing; 11 . . . Case; 12 . . . Handle; 12*a* . . . Grip portion; 12*b* . . . Connecting portion; 13 . . . Nose portion; 14 . . . Injection path; 14*a* . . . Injection port; 15 . . . Power supply mounting portion; 16 . . . Battery; 17 . . . Electric motor; 18 . . . Rotating body (Flywheel); 19 . . . Control circuit (Controller); 20 . . . Magazine; 21 . . . Connected fasteners (Connected nails); 21*a* . . . Fastener (Nail); 30 . . . Blade drive mechanism; 30*a* . . . Blade; 31 . . . First actuator (first solenoid); 32 . . . Pressing roller; 33 . . . Spring (first spring); 34 . . . Movable plate; 34*a* . . . First connecting pin; 34*b* . . . Second connecting pin; 35 . . . support plate; 35*a* . . . First elongated hole; 36 . . . Connecting plate; 36*a* . . . Second elongated hole; 50 . . . Supply mechanism; 60 . . . Feeder; 60*a* . . . Pin; 70 . . . Power mechanism; 71 . . . Movable member; 71*a* . . . Pressing surface; 71*b* . . . Third elongated hole; 72 . . . Second actuator (Second solenoid); 73 . . . First roller; 74 . . . Second roller; 75 . . . Engaging portion; 75*a* . . . Front surface; 80 . . . Energizing member; 81 . . . Stopper; 81*a* . . . Spring; 90 . . . Servomotor; and 90 . . . Second electric motor.

PL . . . Push lever; and TG . . . Trigger.

The invention claimed is:

1. A driving device comprising:

a housing having a nose that includes an injection path;

a magazine accommodating collated fasteners, wherein the collated fasteners are fasteners connected together and arranged in a coil;

a supply mechanism configured to supply the fasteners to the injection path one by one, a blade operable to hit one of the fasteners that is supplied to the injection path;

a first actuator powered by a battery mounted in the housing;

a second actuator powered by the battery; and a control circuit configured to control the first actuator and the second actuator, wherein the supply mechanism includes:

a feeder operable to move in a first direction to feed the fasteners to the injection path one by one and move in a second direction away from the injection path;

an energizing mechanism configured to apply an energizing force to the feeder to cause the feeder to move in the first direction; and a stopper operable to switch between a first state and a second state by the second actuator, wherein in the first state, the stopper holds the feeder against the energizing force of the energizing mechanism and in the second state, the stopper allows the feeder to move in the first direction, wherein the first actuator moves the feeder in the second direction, and the stopper holds the feeder that has moved in the second direction, and wherein when the second actuator causes the stopper to release the feeder, the energizing force of the energizing mechanism causes the feeder to move in the first direction.

2. The driving device according to claim 1, further comprising:

a rotating body rotated and driven by the first actuator;

a pressing roller that brings the blade into pressure contact with the rotating body; and a spring that energizes the blade, wherein the blade is driven in a driving direction against energization of the spring when the blade is brought into pressure contact with the rotating body by the pressing roller, and wherein the blade is driven in a counter-driving direction by the energization of the spring when bringing the blade into pressure contact with the rotating body by the pressing roller is released.

3. The driving device according to claim 2, further comprising a power mechanism giving the feeder a driving force that moves the feeder in the second direction, wherein the power mechanism includes a movable member displaceable between an operating position and a standby position, wherein when the movable member is displaced to the operating position, a rotational force of the rotating body is transmitted to the feeder and the feeder moves in the second direction against energization of the energizing mechanism, and wherein when the movable member is displaced to the standby position, engagement between the movable member and the stopper is released and the rotational force of the rotating body is not transmitted to the feeder and the feeder moves in the first direction due to the energization of the energizing mechanism.

4. The driving device according to claim 3, wherein the power mechanism includes:

the second actuator that displaces the movable member between the operating position and the standby position;

a first roller that abuts on the feeder; and a second roller that, with displacement of the movable member to the operating position, abuts on both of the rotating body and the first roller and transmits the rotational force of the rotating body to the first roller.

5. The driving device according to claim 4, wherein the second actuator is an electric motor.

6. The driving device according to claim 2, further comprising a fan or fin that rotates with rotation of the rotating body and generates cooling air for cooling the second actuator.

7. The driving device according claim 1, further comprising:

a rotating body rotated and driven by the first actuator;

a plurality of first engaging portions provided on the rotating body;

a plurality of second engaging portions provided on the blade; and a spring energizing the blade in a driving direction, wherein when the rotating body rotates, the first engaging portions and the second engaging portions are sequentially engaged with one another and the blade is driven in a counter-driving direction against energization of the spring, and wherein when engagement between the first engaging portions and the second engaging portions is released, the blade is driven in the driving direction by the energization of the spring.

8. The driving device according to claim 1, wherein the second actuator is a solenoid actuator.

9. The driving device according to claim 1, wherein the stopper is engaged and disengaged with and from the feeder, wherein the feeder is prevented operating in the first direction when the stopper is engaged, and wherein the feeder is operable in the first direction when the stopper is released.

10. The driving device according to claim 9, wherein the feeder has a protrusion portion that protrudes in a direction intersecting with the first direction, wherein the stopper is operable in a direction intersecting with the first direction, and wherein an operating position of the stopper includes:

a first position where the stopper is engaged with the protrusion portion; and a second position where the stopper is disengaged from the protrusion portion.

11. The driving device according to claim 10, wherein the second actuator that operates the stopper from the first position to the second position.

12. The driving device according to claim 11, further comprising a first energizing portion that applies an energizing force in the second direction to the feeder, wherein the feeder supplies the fasteners to the nose one by one against an energizing force of the first energizing portion when the stopper is operated to the second position.

13. The driving device according to claim 12, further comprising a second energizing portion applying, to the stopper, an energizing force for operating the stopper from the second position to the first position, wherein the second actuator operates the stopper from the first position to the second position against a force of the second energizing portion when power is supplied, wherein the feeder is operable in the first direction in states where the stopper is operated in the second position and suppling the power to the second actuator is cut off and the stopper contacts with the feeder, and wherein the feeder moving in the first direction is prevented when supplying the power to the actuator is stopped and the stopper is operated to the first position.

14. The driving device according to claim 1, wherein the control circuit operates the second actuator to release the stopper before the blade starts moving in a driving direction, thereby moving the feeder in the first direction to supply the fasteners to the injection path one by one.

15. The driving device according to claim 1, wherein the control circuit operates the second actuator to release the stopper after the blade moves in a driving direction and moves in a counter-driving direction, thereby operating the feeder in the first direction to supply the fasteners to the injection path one by one.

16. The driving device according to claim 1, wherein the energizing mechanism includes a coil spring, and wherein the feeder compresses the coil spring while moving in the second direction by the first actuator.

17. The driving device according to claim 1, wherein the first actuator is an electric motor that operates the blade.

18. The driving device according to claim 1, wherein the first actuator is a solenoid actuator.

19. The driving device according to claim 1, wherein the first actuator is an electric motor.

20. A driving device comprising:

a housing having a nose portion that forms an injection path;

a blade hitting a fastener that is supplied to the injection path;

an energizing mechanism operating the blade in a driving direction of the fastener;

an electric motor operating the blade against an energizing force of the energizing mechanism;

a control circuit controlling drive of the electric motor;

a magazine accommodating connected fasteners wound in a roll shape; and a supply mechanism sequentially supplying the connected fasteners, which is accommodated in the magazine, to the injection path, wherein the supply mechanism includes a feeder capable of reciprocating in a first direction approaching the injection path and a second direction away from the injection path, and wherein the feeder is energized in the first direction by the energizing mechanism.

21. The driving device according to claim 20, further comprising a gas chamber that is filled with gas, wherein the blade is movable in a driving direction of and in a counter-driving direction opposite to the driving direction, wherein the electric motor increases pressure in the gas chamber by operating the blade in the counter-driving direction against the pressure in the gas chamber, and wherein the feeder operates in the first direction due to the pressure in the gas chamber.

22. The driving device according to claim 21, wherein the feeder moves in the first direction when the blade is operated in the counter-driving direction and the pressure in the gas chamber is increased.

23. A driving device comprising:

a housing having a nose portion that forms an injection path;

a blade hitting a fastener that is supplied to the injection path;

an electric motor powered by a battery mounted in the housing;

an operating portion that an operator is capable of operating;

a control circuit controlling drive of the electric motor;

a magazine accommodating connected fasteners wound in a roll shape; and a supply mechanism sequentially supplying the connected fasteners, which is accommodated in the magazine, to the injection path, wherein the supply mechanism includes:

a feeder capable of reciprocating in a first direction approaching the injection path and a second direction away from the injection path;

an energizing mechanism for energizing the feeder in the first direction;

a stopper holding a position of the feeder against energization of the energizing mechanism; and a solenoid actuator that is powered by the battery and is operated by the control circuit, wherein a position of the feeder that has operated in the second direction is held by the stopper, and wherein the control circuit operates the solenoid actuator to release the holding of the stopper before the blade starts moving in a driving direction after the operating portion is operated, thereby moving the feeder in the first direction to supply the fastener to the injection path.

* * * * *